(12) United States Patent
Kawasaki et al.

(10) Patent No.: US 11,445,084 B2
(45) Date of Patent: Sep. 13, 2022

(54) WORK PROCESS MANAGING SYSTEM TO MANAGE PROGRESS OF A JOB INCLUDING MULTIPLE WORK PROCESSES, WORK PROCESS MANAGING METHOD, AND WORK PROCESS MANAGING APPARATUS

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/198,468

(22) Filed: Mar. 11, 2021

(65) Prior Publication Data
US 2021/0297553 A1    Sep. 23, 2021

(30) Foreign Application Priority Data

Mar. 17, 2020    (JP) .............................. JP2020-046997

(51) Int. Cl.
*H04N 1/32*    (2006.01)
*H04N 1/00*    (2006.01)

(52) U.S. Cl.
CPC ..... *H04N 1/32352* (2013.01); *H04N 1/00477* (2013.01)

(58) Field of Classification Search
CPC .................................................. H04N 1/32352
(Continued)

(56) References Cited

U.S. PATENT DOCUMENTS

2018/0046416 A1*   2/2018   Watanabe ............. G06F 3/1285
2020/0034592 A1    1/2020   Kawasaki et al.
(Continued)

FOREIGN PATENT DOCUMENTS

EP   628927   12/1994
FR   2791791  10/2000
(Continued)

OTHER PUBLICATIONS

Kanna Miwa et al: "Module-based modeling and analysis of a manufacturing system adopting a dual-card kanban system with a delivery cycle", Dec. 11, 2016; Dec. 11, 2016-Dec. 14, 2016, Dec. 11, 2016, pp. 2832-2843, XP058310125, DOI: 10.1109/WSC.2016.7822319 ISBN: 978-1-5090-4484-9.
(Continued)

*Primary Examiner* — Jacky X Zheng
(74) *Attorney, Agent, or Firm* — IPUSA, PLLC

(57) ABSTRACT

An information processing system manages progress of a job including one or more work processes. The information processing system includes one or more imagers that are associated with the one or more work processes of the job and configured to capture a form being transferred together with a work object of the job; and a processor programmed to execute a process including managing the one or more work processes of the job based on the one or more imagers capturing the form, recognizing a mark image indicating transferability from image data of the form captured by the one or more imagers, and managing whether the work object is transferable to a next work process based on the mark image recognized from the image data obtained by capturing the form.

11 Claims, 24 Drawing Sheets

(58) Field of Classification Search
USPC .......................................................... 358/1.13
See application file for complete search history.

(56) References Cited

U.S. PATENT DOCUMENTS

2020/0293239 A1    9/2020   Kawasaki et al.
2022/0027111 A1*   1/2022   Lu ......................... G06K 7/1465

FOREIGN PATENT DOCUMENTS

| JP | 2005-100298 | 4/2005 |
| JP | 2017-199306 | 11/2017 |
| JP | 2020-021181 | 2/2020 |

OTHER PUBLICATIONS

Extended European Search Report for 21162055.4 dated Jul. 13, 2021.

* cited by examiner

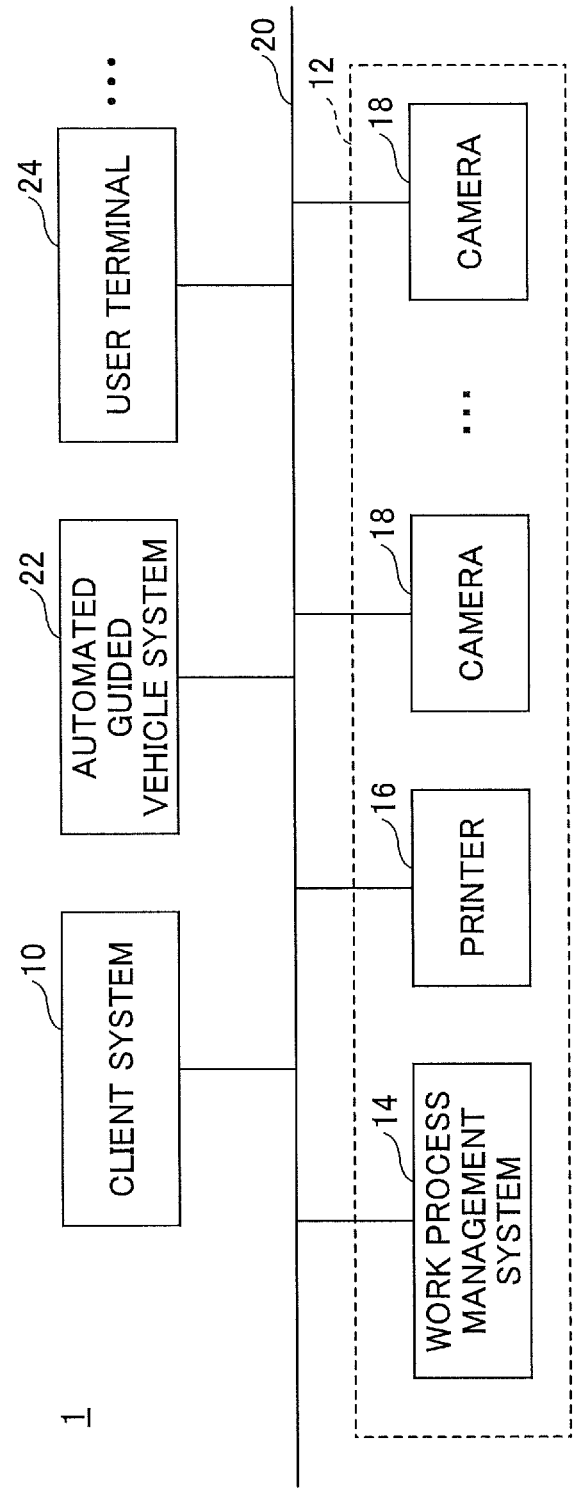

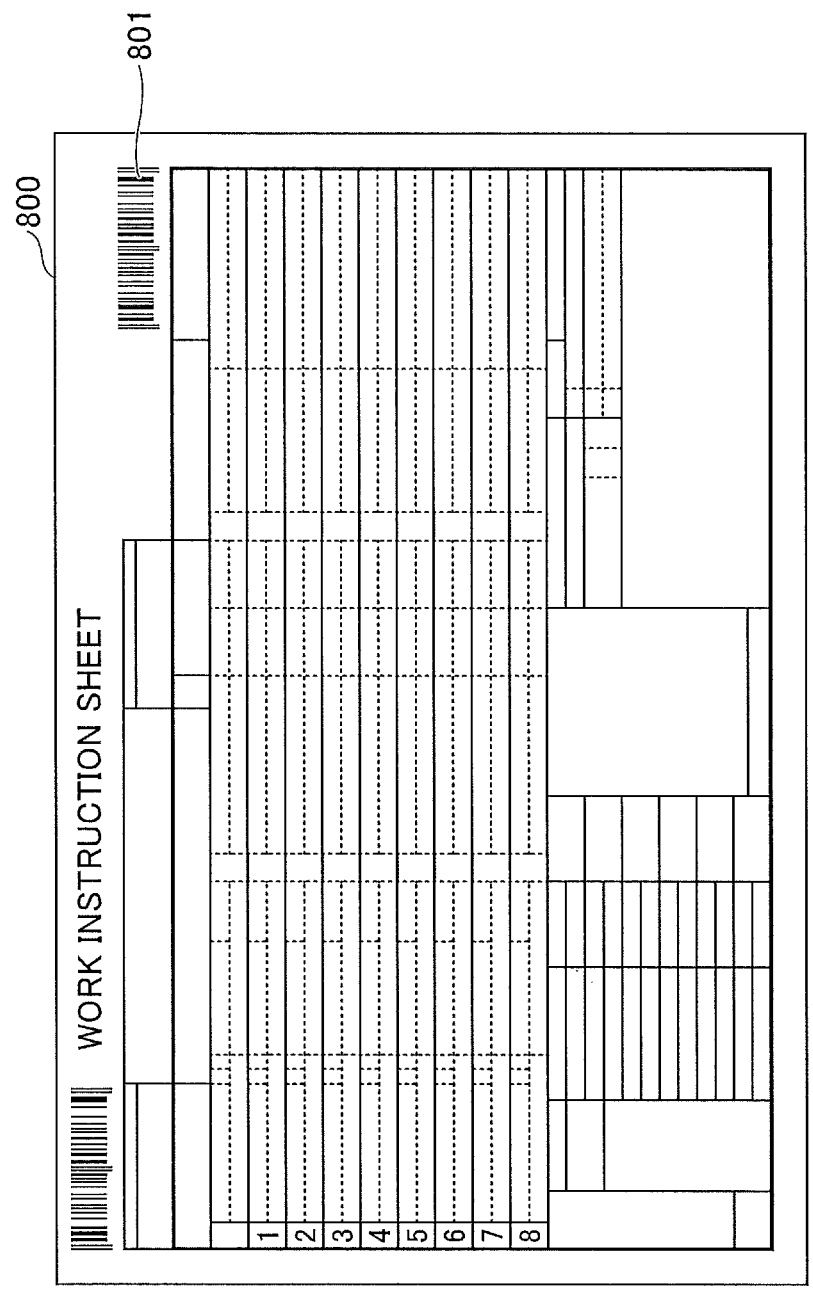

FIG.2B
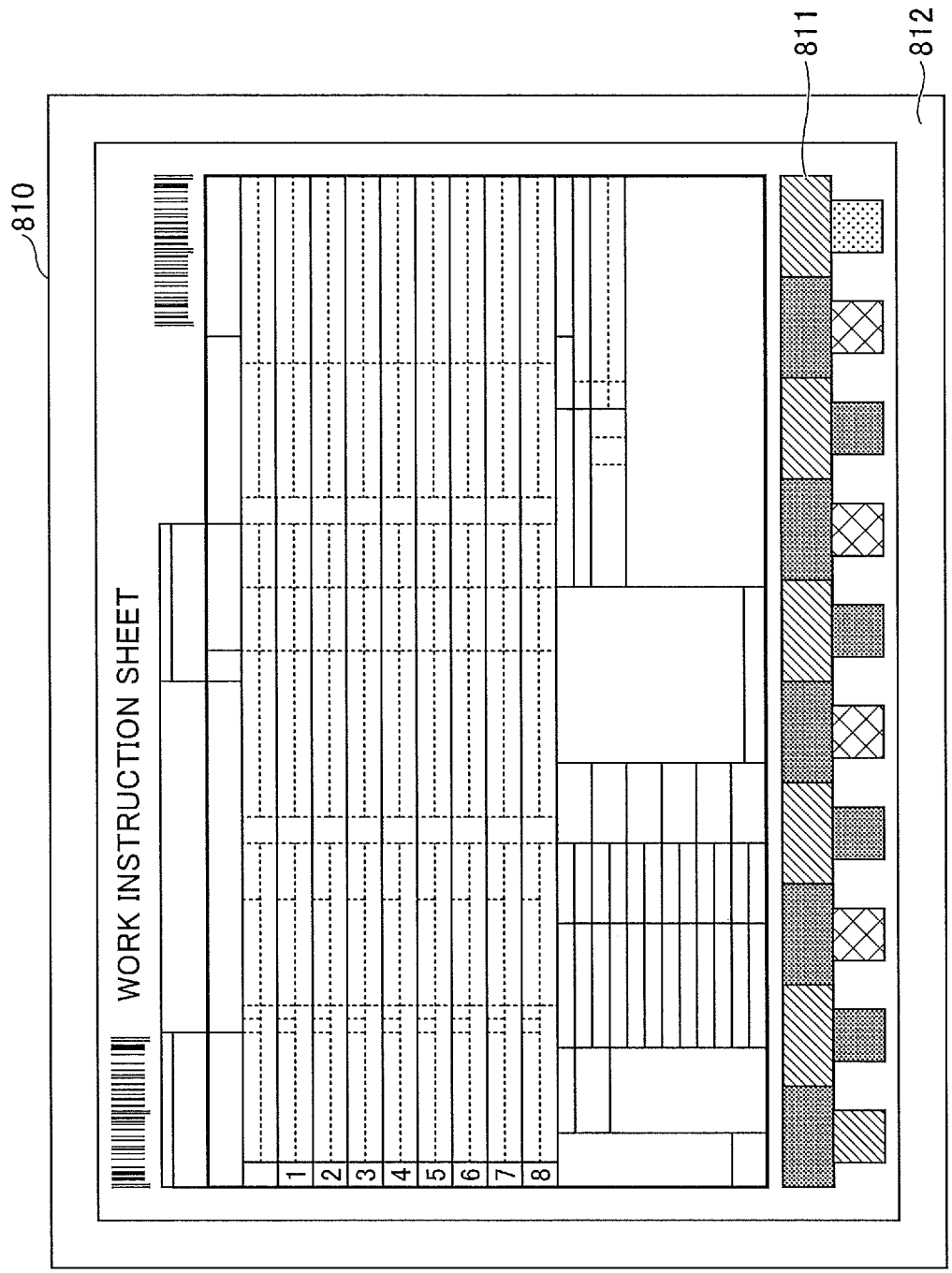
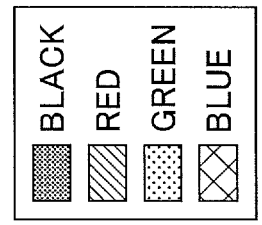

FIG.6

| JOB ID | STATE FLAG | CONTROL FLAG |
|---|---|---|
| A | 0 | 0 |
| B | 1 | 0 |
| C | 1 | 1 |

FIG.10A
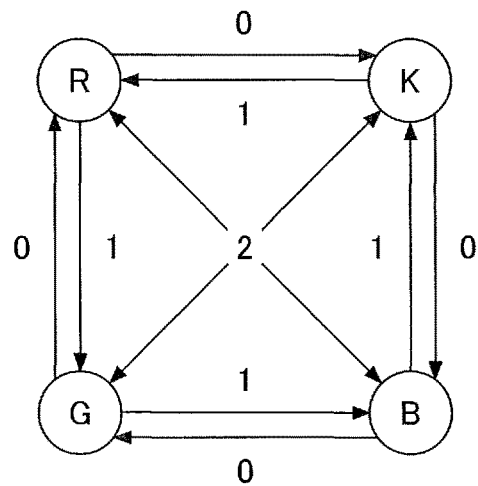
FIG.10B
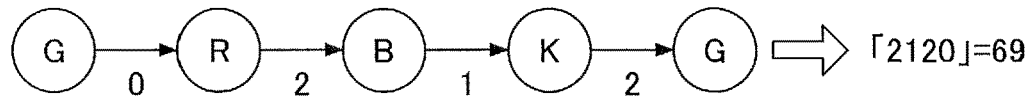
⇒ 「2120」=69
FIG.10C
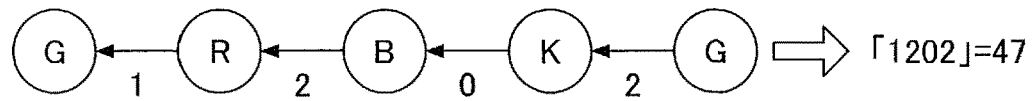
⇒ 「1202」=47
FIG.10D
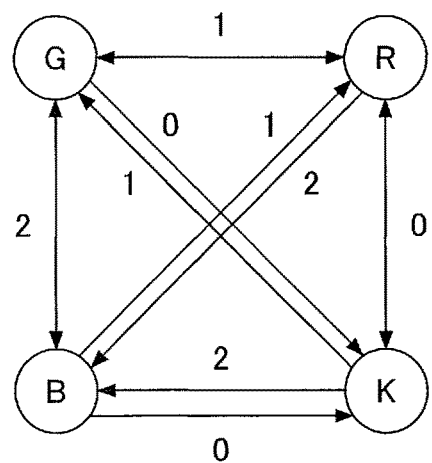
FIG.10E
| | 0 | 1 | 2 |
|---|---|---|---|
| R | K | G | B |
| G | K | R | B |
| B | K | R | G |
| K | R | G | B |

FIG.23

| JOB ID | COLOR CODE ID | STATES OF WORK PROCESSES | | | | |
|---|---|---|---|---|---|---|
| | | PRINTING | CUTTING | FOLDING | BINDING | INSPECTION |
| A | AA | COMPLETED | COMPLETED | COMPLETED | COMPLETED | |
| B | BB | COMPLETED | COMPLETED | | | |
| C | CC | COMPLETED | | | | |
| D | DD | COMPLETED | COMPLETED | COMPLETED | | |
| E | EE | COMPLETED | COMPLETED | COMPLETED | | |
| F | FF | | | | | |

FIG.24

| CAMERA | STATES OF WORK PROCESSES |
|---|---|
| CAMERA 18a1 | PRINTING |
| CAMERA 18a2 | CUTTING |
| CAMERA 18a3 | FOLDING |
| CAMERA 18a4 | BINDING |
| CAMERA 18a5 | INSPECTING |
| CAMERA 18b1 | PRINTING COMPLETED |
| CAMERA 18b2 | FOLDING COMPLETED |

# WORK PROCESS MANAGING SYSTEM TO MANAGE PROGRESS OF A JOB INCLUDING MULTIPLE WORK PROCESSES, WORK PROCESS MANAGING METHOD, AND WORK PROCESS MANAGING APPARATUS

CROSS-REFERENCE TO RELATED APPLICATION

The present application claims priority under 35 U.S.C. § 119 to Japanese Patent Application No. 2020-046997, filed on Mar. 17, 2020. The contents of which are incorporated herein by reference in their entirety.

BACKGROUND OF THE INVENTION

1. Field of the Invention

An aspect of this disclosure relates to an information processing system, an information processing method, a storage medium, and an information processing apparatus.

2. Description of the Related Art

There is a known method where the progress of a job including multiple work processes is managed by using, for example, a barcode printed on a work instruction sheet.

Also, for example, Japanese Unexamined Patent Publication No. 2005-100298 discloses a system where RFID tags are attached to workers and work objects (e.g., materials, in-process items, and products in a factory), and the work time of the workers and the flow (entry and exit into and from a work place) of the work objects are managed by reading the RFID tags at the entrance gate at the entrance of a processing plant and the exit gate at the exit of the processing plant.

For example, when a job including one or more work processes is performed at multiple places and/or workers in a factory, it is necessary to manage, with a management system, whether a work object of the job stored in, for example, a temporary storage location is in a state where the current work process has not been completed and the work object is not transferable to the next work process or in a state where the current work process has been completed and the work object is transferable to the next work process. Therefore, the worker needs to manually enter the state of the work object of the job into the management system.

SUMMARY OF THE INVENTION

According to an aspect of this disclosure, there is provided an information processing system for managing progress of a job including one or more work processes. The information processing system includes one or more imagers that are associated with the one or more work processes of the job and configured to capture a form being transferred together with a work object of the job; and a processor programmed to execute a process including managing the one or more work processes of the job based on the one or more imagers capturing the form, recognizing a mark image indicating transferability from image data of the form captured by the one or more imagers, and managing whether the work object is transferable to a next work process based on the mark image recognized from the image data obtained by capturing the form.

BRIEF DESCRIPTION OF THE DRAWINGS

FIG. 1 is a drawing illustrating an example of a configuration of a job management system according to an embodiment;

FIGS. 2A and 2B are drawings illustrating examples of work instruction sheets used in the job management system of the present embodiment;

FIG. 6 is an example of a flag table;

FIGS. 10A through 10E are drawings for explaining coding rules that can express ternary numbers;

FIG. 23 is an example of a table T1 where job IDs, color code IDs, and job information are associated with each other; and FIG. 24 is an example of a table T2 where camera identifiers and states of work processes are associated with each other.

DESCRIPTION OF THE EMBODIMENTS

Figure 3:
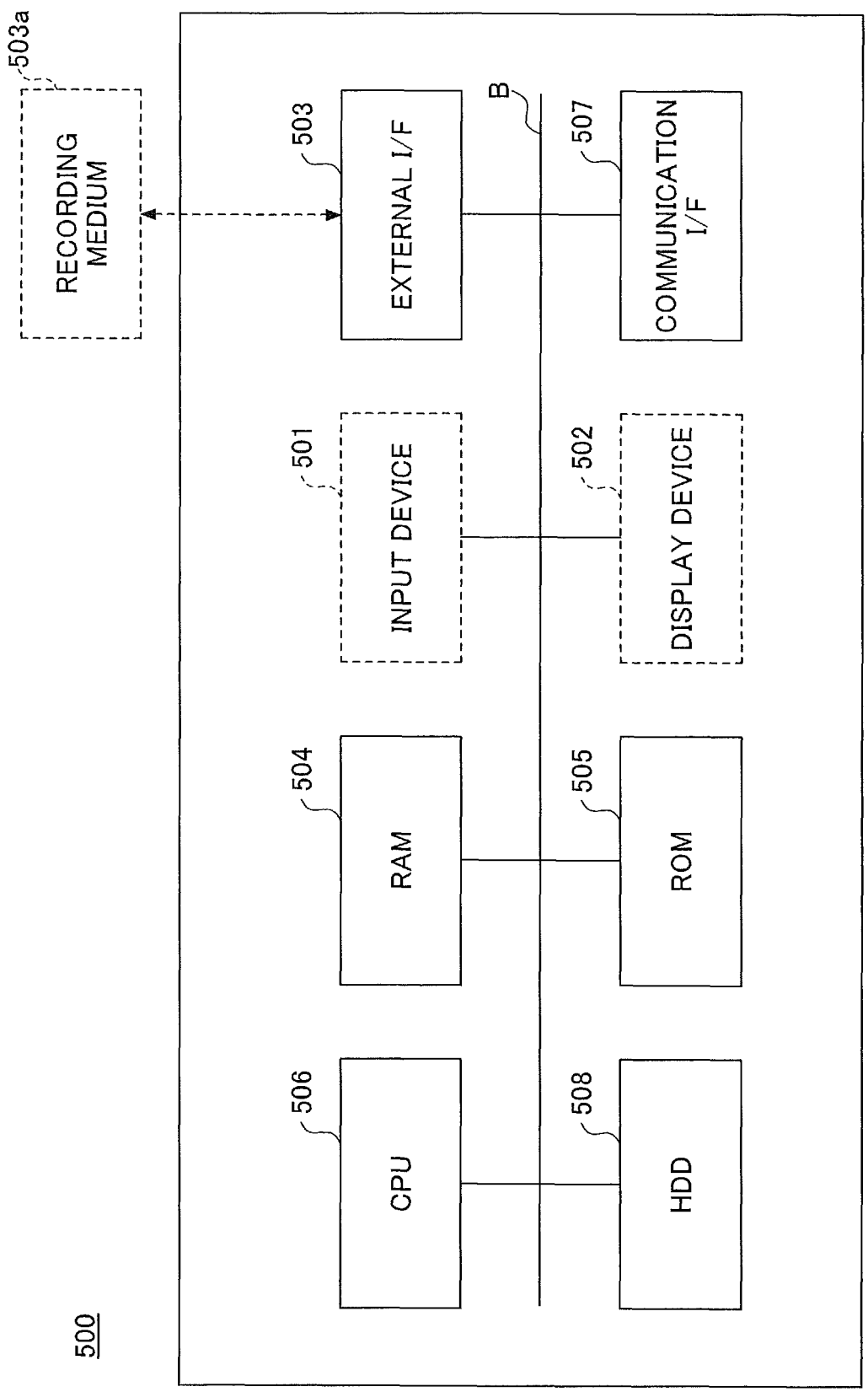
FIG. 3 is a drawing illustrating an example of a hardware configuration of a computer.

An aspect of this disclosure provides an information processing system that makes it possible to easily manage job work objects that are transferable to the next work processes.

Embodiments of the present invention are described below with reference to the accompanying drawings. The embodiments are described using, as an example, a job management system that manages work processes of a job in a printing factory using a work instruction sheet (form) and a card (a paper sheet or a device on which a mark image indicating transferability is printed or displayed). However, the present invention is not limited to the management of work processes of a job in a printing factory.

First Embodiment

<System Configuration>

FIG. 1 is a drawing illustrating an example of a configuration of a job management system according to a first embodiment. FIGS. 2A and 2B are drawings illustrating examples of work instruction sheets used in the job management system of the first embodiment. A job management system 1 illustrated in FIG. 1 includes a client system 10, a work process management system 14, a printer 16, one or more cameras 18, an automated guided vehicle system 22, and one or more user terminals 24 that are connected to each other via a network 20 such as the Internet or a LAN to enable data communications. The automated guided vehicle system 22 and the one or more user terminals 24, or an automated guided vehicle 1100 described later and a worker, are examples of destinations to which information indicating a job work object transferable to the next work process is reported. The job management system 1 may not necessarily include both of the automated guided vehicle system 22 and the one or more user terminals 24.

The client system 10 is an example of an existing system used by a client, and generates a work instruction sheet 800 of FIG. 2A for the client system 10. The work instruction sheet 800 includes a job ID. The job ID is an example of an identifier for identifying a job. In the example illustrated in FIG. 2A, the work instruction sheet 800 for the client system 10 includes a barcode image 801 used in the client system 10.

The job ID may be indicated by a barcode image 801 on the work instruction sheet 800 for the client system 10, or may be indicated by text. The client system 10 provides, to a worker as an example of a user, an existing function implemented by the work instruction sheet 800 for the client system 10.

The work process management system 14, the printer 16, and one or more cameras 18 constitute an information processing system 12 that adds new functions to the work instruction sheet 800 and a card 900 described later. The work process management system 14 manages the progress of a job including multiple work processes and job work objects that are transferable to the next work processes by using a work instruction sheet 810 for the information processing system 12 and the card 900 described later. As illustrated in FIG. 2B, the work instruction sheet 810 includes a color code image 811.

The work instruction sheet 810 for the information processing system 12 illustrated in FIG. 2B is rimmed with a colored peripheral part 812. Hereafter, the color of the peripheral part 812 is referred to as a border color. With the work instruction sheet 810 rimmed with the peripheral part 812 having the border color, the boundary between the work instruction sheet 810 and an item (e.g., printed matter) placed under the work instruction sheet 810 becomes clear and the visibility of the work instruction sheet 810 increases. For example, the border color is printed on the periphery or the edge of a work instruction sheet. The same border color or similar border colors may be used for parts constituting a job, and different border colors may be used for different jobs. Printing border colors on work instruction sheets makes it easier for a worker to visually identify management targets such as work objects including printed matter placed in a factory or a warehouse even at a long distance.

In the example of FIG. 2B, the entire peripheral part 812 of the work instruction sheet 810 is colored with a border color. However, only portions (e.g., one or two sides) of the peripheral part 812 may be colored with the border color. The shape and size of the peripheral part 812 in FIG. 2B are examples. The information processing system 12 can identify a job ID based the color code image 811 as described later.

The card 900, which is described later, is used to indicate that a job work object (printed matter that is an example of an intermediate product or a material) on which the card 900 is placed or attached is transferable to the next work process because the current work process has been completed. The card 900 may also be placed on or attached to a cargo platform such as a pallet on which the job work object is placed. The cargo platform is an example of transportation equipment.

The printer 16 prints the work instruction sheet 810 for the information processing system 12. The printer 16 may also print the card 900 described later. The cameras 18 are installed to be able to capture images of locations in the printing factory corresponding to job work processes. The locations corresponding to job work processes indicate, for example, locations that the printed matter passes through when being moved between work process locations and temporary storage locations where the printed matter is temporarily stored.

The cameras 18 may be implemented by PTZ (pan, tilt, zoom) cameras and/or IP cameras. The PTZ camera includes pan, tilt, and zoom (PTZ) functions that can be controlled via the network 20 and can transmit captured images and captured videos via the network 20.

The IP camera can be operated via the network 20 and can transmit captured images and captured videos via the network 20. Images and videos captured by the cameras 18 are transmitted via the network 20 to the work process management system 14.

In the information processing system 12 that adds new functions to the work instruction sheet 800 and the card 900, the work instruction sheet 810 for the information processing system 12 and the card 900 may be placed on or attached to the corresponding job work object. The work instruction sheet 810 for the information processing system 12 and the card 900 may also be placed on or attached to a cargo platform such as a pallet on which the job work object is placed. The work instruction sheet 810 and the card 900 may be placed on or attached to a work object such as printed matter or a pallet on which the work object is placed such that the work instruction sheet 810 and the card 900 can be reliably captured by the camera 18.

The work process management system 14 manages the progress (job status) of work processes of a job based on a work process of the job corresponding to the camera 18 that has captured the work instruction sheet 810 and the job ID identified based on the work instruction sheet 810. Also, the work process management system 14 manages the history of the work processes of the job and manages captured images and captured videos indicating states at the time of capturing the work instruction sheet 810.

Further, the work process management system 14 manages a job work object that is transferable to the next work process due to completion of work based on a job work process corresponding to the camera 18 that has captured the work instruction sheet 810 and the card 900.

The automated guided vehicle system 22 controls an automated guided vehicle (AGV) described later and thereby transfers a job work object transferable to the next work process to, for example, a temporary storage location for the next work process. The user terminal 24 is an information processing terminal operated by a worker who is an example of a user. The user terminal 24 displays information on a job work object transferable to the next work process, and causes the job work object transferable to the next work process to, for example, a temporary storage location for the next work process.

The configuration of the job management system 1 illustrated in FIG. 1 is an example. For example, the job management system 1 may also include other systems, and the work process management system 14 may have a different name. The work process management system 14 may be implemented by one server environment or by multiple server environments.

<Hardware Configuration>

Each of the client system 10, the work process management system 14, the automated guided vehicle system 22, and the user terminal 24 may be implemented by, for example, a computer 500 that is an information processing apparatus with a hardware configuration illustrated in FIG. 3.

FIG. 3 is a drawing illustrating an example of a hardware configuration of the computer 500. As illustrated in FIG. 3, the computer 500 may include an input device 501, a display device 502, an external I/F 503, a random access memory (RAM) 504, a read-only memory (ROM) 505, a central processing unit (CPU) 506, a communication I/F 507, and a hard disk drive (HDD) 508 that are connected to each other via a bus B. The input device 501 and the display 502 may be configured to be connected to the computer 500 when necessary.

The input device 501 includes, for example, a keyboard, a mouse, and/or a touch panel and is used by the user to input operation signals. The display device 502 displays, for example, processing results of the computer 500.

The communication I/F 507 is an interface that connects the computer 500 to various networks. The computer 500 can perform data communications via the communication I/F 507.

The HDD 508 is an example of a non-volatile storage device for storing programs and data. For example, the HDD 508 may store basic software or an operating system (OS) for controlling the entire computer 500, and application software (which is hereafter referred to as applications) for providing various functions on the OS. The HDD 508 in the computer 500 may be replaced with another type of drive such as a solid-state drive (SSD) that uses a flash memory as a storage medium.

The external I/F 503 is an interface with an external device. A recording medium 503a is an example of the external device. The computer 500 can read and write data from and to the recording medium 503a via the external I/F 503. Examples of the recording medium 503a include a flexible disk, a compact disk (CD), a digital versatile disk (DVD), a secure digital (SD) memory card, and a universal serial bus (USB) memory.

The ROM 505 is an example of a non-volatile semiconductor memory (storage device) that can retain programs and data even when power is turned off. For example, the ROM 505 stores programs and data such as a basic input/output system (BIOS) that is executed when the computer 500 is turned on, and OS and network settings of the computer 500. The RAM 504 is an example of a volatile semiconductor memory (storage device) for temporarily storing programs and data.

The CPU 506 is a processor that loads programs and data from storage devices such as the ROM 505 and the HDD 508 into the RAM 504, and executes the loaded programs to control the entire computer 500 and to implement various functions of the computer 500. The client system 10, the work process management system 14, the automated guided vehicle system 22, and the user terminal 24 can perform various processes described later with the hardware configuration of the computer 500 as exemplified in FIG. 3. Descriptions of the hardware configurations of the printer 16 and the camera 18 are omitted here.

<Software Configuration>

Figure 4:
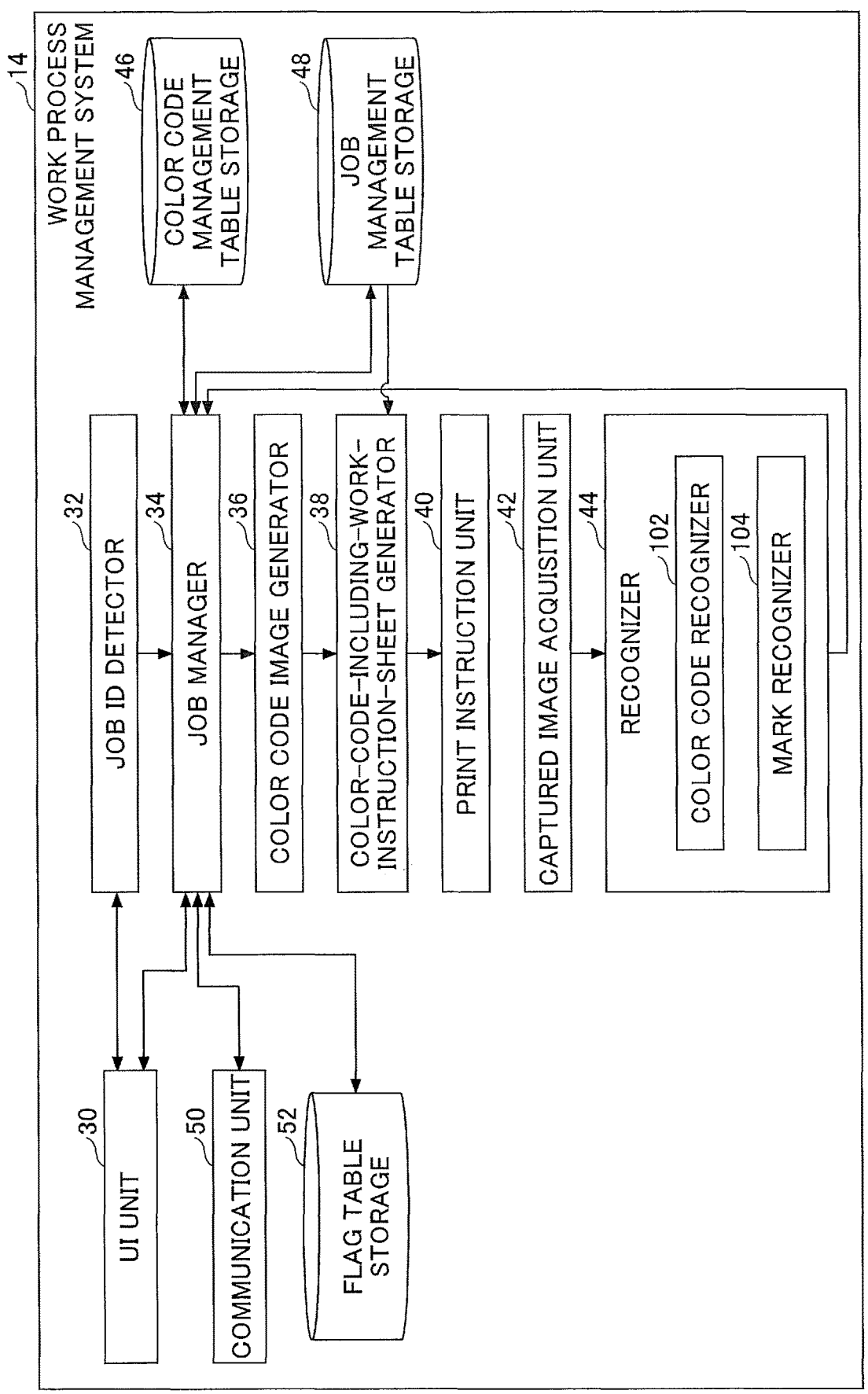
FIG. 4 is a drawing illustrating an example of a functional configuration of a work process management system.

FIG. 4 is a drawing illustrating an example of a functional configuration of the work process management system 14. In the functional configuration of FIG. 4, components not necessary for the explanation of the present embodiment are omitted. As illustrated in FIG. 4, the work process management system 14 includes a UI unit 30, a job ID detector 32, a job manager 34, a color code image generator 36, a color-code-including-work-instruction-sheet generator 38, a print instruction unit 40, a captured image acquisition unit 42, a recognizer 44, a color code management table storage 46, a job management table storage 48, a communication unit 50, and a flag table storage 52. The recognizer 44 includes a color code recognizer 102 and a mark recognizer 104.

The UI unit 30 controls the display of various screens such as a screen for receiving various necessary settings from the worker and a job status list screen.

For example, the job ID detector 32 detects a job ID indicated by the barcode image 801 or text on the work instruction sheet 800 for the client system 10 illustrated in FIG. 2A.

The job manager 34 stores and manages available color code IDs in the color code management table storage 46.

If no unused color code ID is left in the color code management table storage 46, the job manager 34 selects a color code ID whose last updated date is oldest from the color code management table storage 46, and reuses the selected color code ID. The job manager 34 manages the job ID detected by the job ID detector 32 in association with the selected color code ID in the color code management table storage 46.

Also, the job manager 34 stores job IDs, color code IDs, and job information in the job management table storage 48 in association with each other. The job information includes state information that indicates states of job processes. FIG. 23 is an example of a table T1 that is stored in the job management table storage 48. In the table T1, job IDs, color code IDs, and job information are associated with each other.

Also, the job management table storage 48 stores identifiers of the cameras 18 and state information indicating the states of processes in association with each other. FIG. 24 is an example of a table T2 stored in the job management table storage 48 where the identifiers of the cameras 18 and the state information indicating the states of the processes are associated with each other.

The job management table storage 48 is used to further store job progress information and history information of job work processes and captured image files and captured video files indicating states at the time of capturing the work instruction sheet 810 in association with each other and to display, for example, a job status list screen. [0 0 0 1]

The color code image generator 36 generates the color code image 811 based on the color code ID provided by the job manager 34. The color-code-including-work-instruction-sheet generator 38 generates the work instruction sheet 810 for the information processing system 12 by adding the color code image 811 of FIG. 2B and the peripheral part 812 with the border color to the work instruction sheet 800 for the client system 10 illustrated in FIG. 2A. The print instruction unit 40 instructs the printer 16 to print the work instruction sheet 810 for the information processing system 12 illustrated in FIG. 2B, which includes the color code image 811 and is rimmed with the peripheral part 812 with the border color. The print instruction unit 40 may also instruct the printer 16 to print the image data of the card 900 illustrated in FIG. 5.

Figure 5:
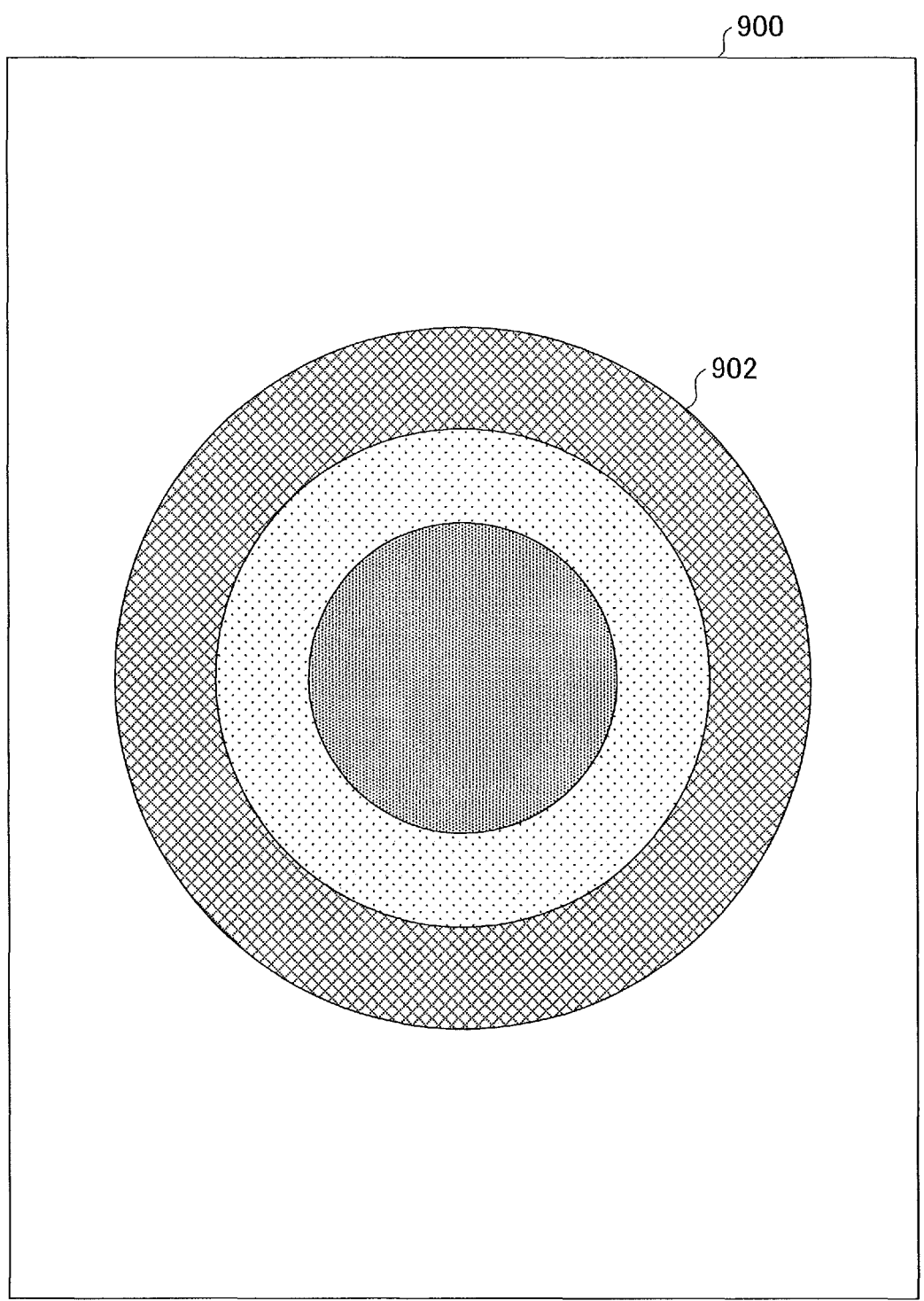
FIG. 5 is a drawing illustrating an example of a card used to indicate that a work object is transferable to the next work process.

FIG. 5 is a drawing illustrating an example of a card used to indicate that a work object is transferable to the next work process. The card 900 of FIG. 5 is, for example, a paper sheet on which a mark image 902 indicating transferability is printed. The mark image 902 indicating transferability is an example and preferably has a design that is unlikely to be printed on the work instruction sheet 810 or a work object.

For example, a worker can input information on a job work object transferable to the next work process in the work process management system 14 by, for example, placing or attaching the card 900 of FIG. 5 on or to the job work object for which a certain work process has been completed or a cargo platform on which the job work object is placed.

The captured image acquisition unit 42 acquires captured images and captured videos from the cameras 18. The color code recognizer 102 of the recognizer 44 decodes the color code ID from the color code image 811 of the work instruction sheet 810 for the information processing system 12 in a captured image or a captured video. The mark recognizer 104 of the recognizer 44 recognizes the card 900 that is captured in the captured image or the captured video together with the work instruction sheet 810 for the information processing system 12.

For example, the recognizer 44 provides, to the job manager 34, an identifier identifying the camera 18 that has captured the color code image 811 and the card 900 or the job work process, the decoded color code ID, and information indicating that the card 900 has been recognized.

The job manager 34 can identify the job ID corresponding to the decoded color code ID by referring to the job management table storage 48. Also, the job manager 34 can determine that the card 900 is placed on or attached to the work object of the job corresponding to the job ID or the cargo platform on which the work object is placed.

With this configuration, the job manager 34 can update the progress information (job status) of job work processes being managed in the job management table storage 48 based on the job work processes corresponding to the cameras 18 capturing the color code image 811 and the job ID corresponding to the decoded color code ID.

Figure 6:
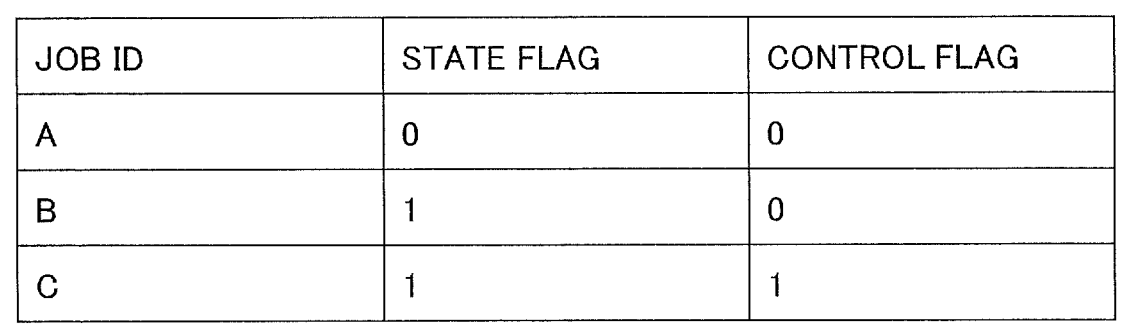

Also, the job manager 34 can update a flag table of FIG. 6 being managed in the flag table storage 52 based on the work processes of the job corresponding to the cameras 18 capturing the color code image 811, the job ID corresponding to the color code ID, and the judgment of whether the card 900 is placed on or attached to the work object of the job or the cargo platform on which the work object is placed.

FIG. 6 is an example of a flag table. The flag table of FIG. 6 includes a job ID, a state flag, and a control flag as fields.

The job ID is an example of identification information for identifying a job. The state flag is information indicating whether a work object is transferable (transferable state) or not transferable (non-transferable state) to the next work process. The control flag is information indicating whether the state flag is valid or invalid.

In the flag table illustrated in FIG. 6, the state flag is "0" and the control flag is "0" for the job with the job ID "A", the state flag is "1" and the control flag is "0" for the job with the job ID "B", and the state flag is "1" and the control flag is "1" for the job with the job ID "C".

Because the state flag is "0", the job with the job ID "A" is in the non-transferable state. Also, because the control flag is "0", the job with the job ID "A" is in a control state where the state flag "0" is valid.

The job with the job ID "B" is in the transferable state because the state flag is "1". Also, because the control flag is "0", the job with the job ID "B" is in a control state where the state flag "1" is valid.

The job with the job ID "C" is in the transferable state because the state flag is "1". Also, because the control flag is "1", the state flag "1" is invalid. That is, the job with the job ID "C" is in a control state where the transferable state is invalid. This indicates that the job with the job ID "C" is being transferred from the previous work process to the current work process, the current work process has not been completed, but the card 900 illustrated in FIG. 5 is placed on the cargo platform.

That is, when the control flag indicates that "the state flag is invalid", the job manager 34 determines that the work object is not transferable to the next work process even if the state flag indicates that the work object is transferable to the next work process.

Thus, based on the job management table, the job manager 34 can identify that the job with the job ID "C" is being transferred from the previous work process to the current work process and the current work process has not been completed. Specifically, the job manager 34 can identify that the job with the job ID "C" is in such a state where the previous process has been completed, the next process has not been completed, the form corresponding to the job ID "C" whose next process state is associated with the completion state has not been captured by the camera 18, and the card 900 is detected in a captured image or a captured video obtained from the camera 18.

Thus, using the flag table of FIG. 6 of the present embodiment makes it possible to prevent mistakenly identifying that a job work object is in the transferable state even when the card 900 is kept placed on or attached to the job work object after the job work object is transferred to the next work process.

The communication unit 50 communicates with the client system 10, the automated guided vehicle system 22, and the user terminal 24. For example, the communication unit 50 sends information, which is received from the job manager 34, on a job work object transferable to the next work process to the automated guided vehicle system 22 to cause the automated guided vehicle 1100 to transfer the job work object. Also, the communication unit 50 can send the information, which is received from the job manager 34 and indicates the job work object transferable to the next work process, to the user terminal 24 and cause the user terminal 24 to display the information.

<Processes>

Figure 7:
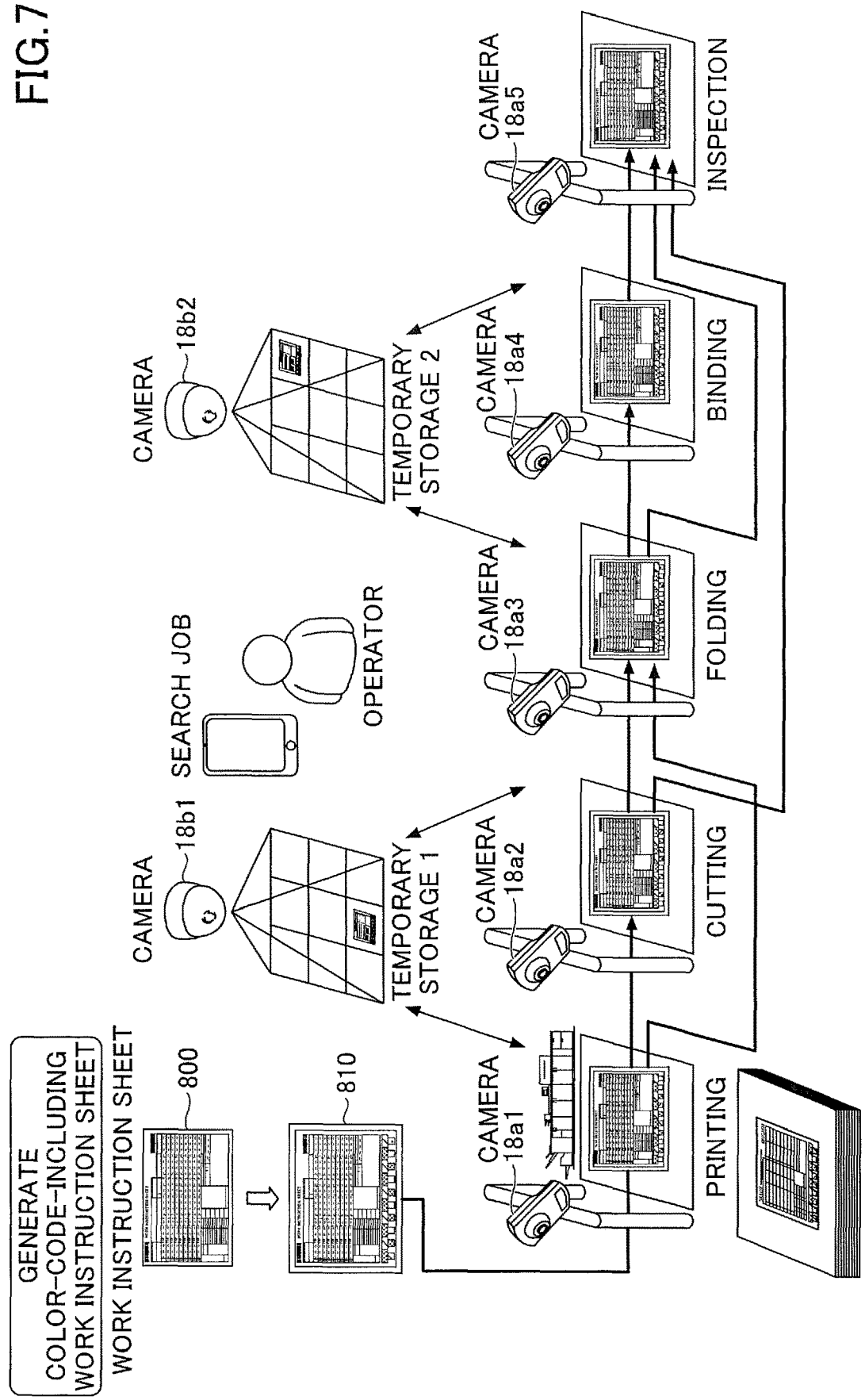
FIG. 7 is a drawing illustrating an example of work processes of a job in a printing factory.

FIG. 7 is a drawing illustrating an example of work processes of a job in a printing factory. The work processes in FIG. 5 includes "printing", "cutting", "folding", "binding", "inspection", "temporary storage 1", and "temporary storage 2". The cameras 18a1 through 18a5 are provided at the gates in front of the places where "printing", "cutting", "folding", "binding", and "inspection" are performed, respectively. Also, cameras 18b1 and 18b2 are provided in places where "temporary storage 1" and "temporary storage 2" are performed.

The work instruction sheet 810 for the information processing system 12 and the card 900 are captured by the cameras 18a1 through 18a5 and the cameras 18b1 and 18b2 while they are moved between work processes and stored in the temporary storage locations. As illustrated in FIG. 7, in the printing factory, movements of work objects among work processes may vary depending on jobs. Accordingly, a job may include a work process where the work instruction sheet 810 for the information processing system 12 and the card 900 are not captured, detected, and recorded. FIG. 7 includes arrows indicating the movements of a job in which all work processes are performed and arrows indicating the movements of jobs where some of the work process are skipped.

In FIG. 7, after printed matter is output by the work process "printing", the work instruction sheet 810 is placed on or attached to the printed matter. Also, in FIG. 7, the card 900 is placed on or attached to the printed matter of a job transferable to the next work process. Accordingly, in the example of FIG. 7, the work instruction sheet 810 and the card 900 placed on or attached to the printed matter are captured by the cameras 18a1 through 18a5 and the cameras 18b1 and 18b2 while the printed matter passes through the gates and is stored in the temporary storage locations.

<<Creation of Color-Code-Including Work Instruction Sheet Rimmed with Peripheral Part Having Border Color>>

Figure 8:
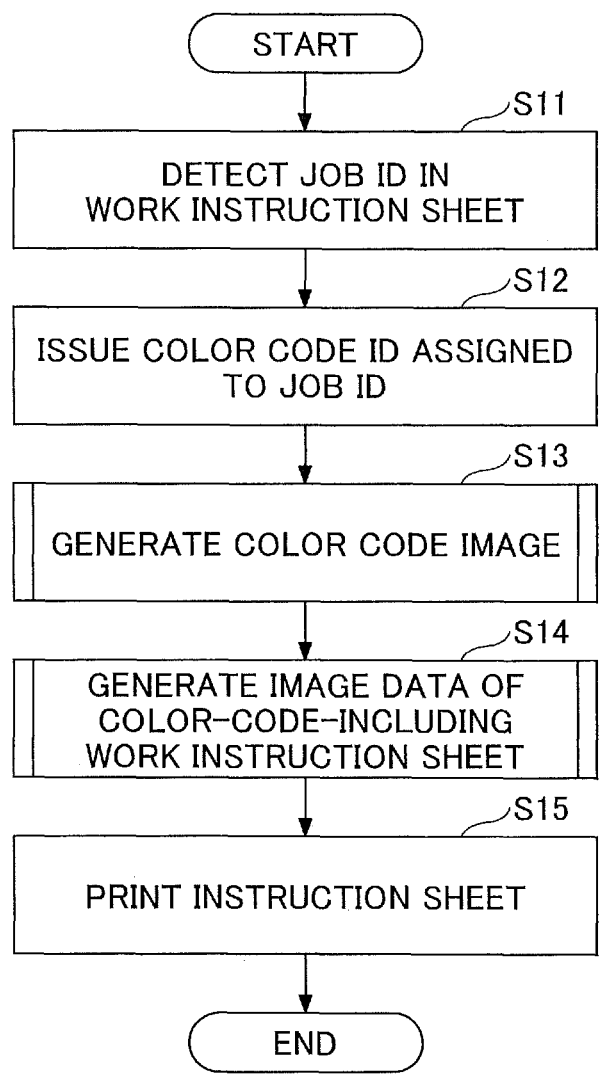
FIG. 8 is a flowchart illustrating an example of a process of generating a color-code-including work instruction sheet rimmed with a peripheral part having a border color.

FIG. 8 is a flowchart illustrating an example of a process of generating a color-code-including work instruction sheet rimmed with a peripheral part having a border color. At step S11, the job ID detector 32 of the work process management system 14 detects the job ID indicated by the barcode image 801 or text on the work instruction sheet 800 for the client system 10. A detection frame for detecting the job ID from the work instruction sheet 800 may be set in advance by an operator or may be automatically set by using, for example, optical character recognition (OCR).

At step S12, the job manager 34 selects a color code ID to be used from the color code management table storage 46, and manages the selected color code ID and the job ID detected by the job ID detector 32 in association with each other.

Figure 9:
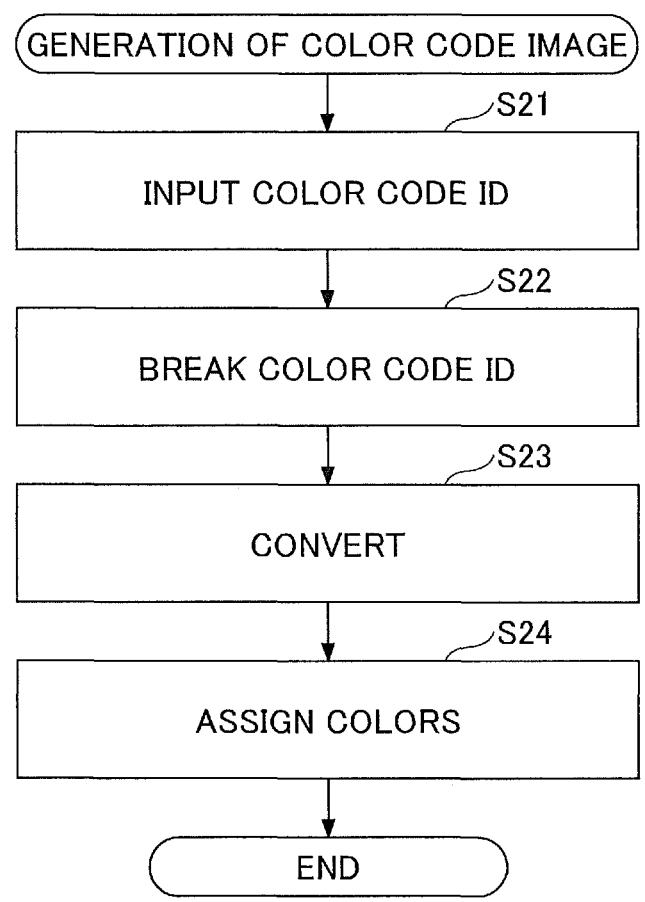
FIG. 9 is a flowchart illustrating an example of a process of generating a color code image.

At step S13, the color code image generator 36 generates the color code image 811 from the color code ID associated with the job ID according to a process illustrated in FIG. 9. The process illustrated in FIG. 9 may use, for example, a technology described in Japanese Unexamined Patent Application Publication No. 2017-199306.

FIG. 9 is a flowchart illustrating an example of a process of generating a color code image. At step S21, the color code image generator 36 receives an input of a color code ID to be color-coded. At step S22, the color code image generator 36 breaks the character string of the color code ID into values of respective digits. At step S23, the color code image generator 36 converts each of the values of the digits into a value corresponding to the number of colors assigned to the cells of an optical symbol described in Japanese Unexamined Patent Application Publication No. 2017-199306. For example, when the number of colors assigned to the cells is four, the color code image generator 36 converts each of the values of the digits into a ternary number according to, for example, a coding rule illustrated in FIGS. 10A through 10E.

FIGS. 10A through 10E are drawings for explaining coding rules that can express ternary numbers. FIGS. 10A through 10E illustrate examples of coding rules in a case where four colors including an R color (red), a G color (green), a B color (blue), and a K color (black) are used. When four colors are used, the colors can be expressed with three values, i.e., ternary numbers.

For example, as illustrated in FIG. 10A, each clockwise transition, from the R color to the K color, from the K color to the B color, from the B color to the G color, or from the G color to the R color, represents a value "0". Also, each counterclockwise transition, from the R color to the G color, from the G color to the B color, from the B color to the K color, or from the K color to the R color, represents a value "1". Further, each diagonal transition, i.e., each of the transitions between the R color and the B color in both directions and the transitions between the K color and the G color in both directions, represents a value "2".

FIG. 10B illustrates an example where the cell color transitions from left to right in a cell row where cells with the G color, the R color, the B color, the K color, and the G color are connected in this order. In this case, the transition from the G color to the R color represents a value "0", the transition from the R color to the B color represents a value "2", the transition from the B color to the K color represents a value "1", and the transition from the K color to the G color represents a value "2". Accordingly, the arrangement of FIG. 10B represents a value "3d2120", i.e., a decimal value "69". In the notation of the value, "3d" at the beginning indicates that the subsequent number is a ternary number.

The coding rule using the color transitions of four colors is not limited to the example illustrated in FIG. 10A and may be implemented by an example illustrated in FIG. 10D. FIG. 10E illustrates an example of a conversion table that associates color transitions with values according to the coding rule illustrated in FIG. 10D. In FIG. 10E, when, for example, the color of a transition source cell is the R color and a value "2" is to be expressed, the B color is set as the color of a transition destination cell that is adjacent to the transition source cell. Similarly, when the color of the transition source cell is the K color and a value "1" is to be expressed, the G color is set as the color of the transition destination cell.

At step S24 following step S23 of FIG. 9, the color code image generator 36 assigns a color to each cell of the optical symbol based on the color of the transition source cell, the ternary number converted at step S23, and a conversion table for the coding rule as illustrated in FIG. 10A. Here, it is assumed that the color code image generator 36 stores, in advance, the arrangement of the colors of cells in the cell row of the main code of the optical symbol.

Figure 11:
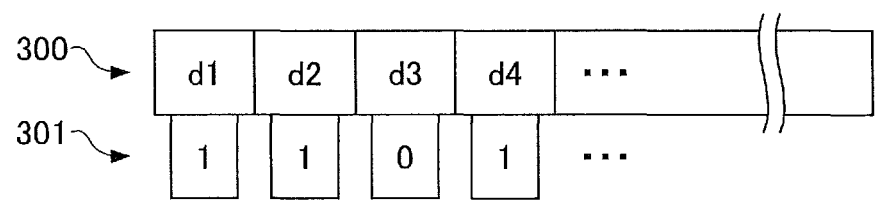
FIG. 11 is a drawing illustrating an example of information to be coded into an optical symbol.
Figure 12:
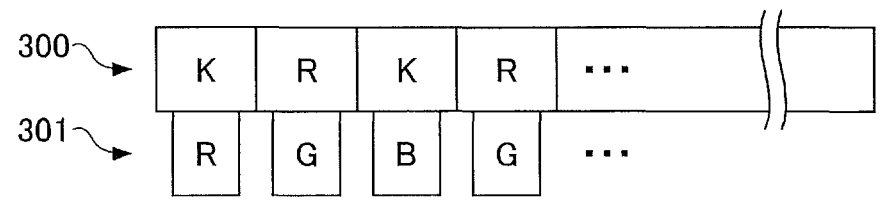
FIG. 12 is a drawing illustrating an example of an optical symbol where the number of colors assigned to the cells of the optical symbol is four.

More specific examples of a case where four colors are assigned to the cells of an optical symbol are described with reference to FIGS. 11 and 12. FIG. 11 is a drawing illustrating an example of information to be coded into an optical symbol. FIG. 12 is a drawing illustrating an example of an optical symbol where the number of colors assigned to the cells of the optical symbol is four.

In the example of FIG. 11, cells of a sub code part 301 connected to cells "d1", "d2", "d3", and "d4" of a main code part 300 have values "3d1", "3d1", "3d0", and "3d1".

FIG. 12 illustrates an example of an optical symbol obtained by coding the information illustrated in FIG. 11 according to the coding rule described with reference to FIGS. 10A through 10E. In this example, the cell row of the main code part 300 includes an even number of cells, the leading cell has the K color, and the K color and the R color are arranged alternately.

In the sub code part 301, for example, a color is assigned to the leftmost cell based on an assumption that the K color of the cell of the main code part 300 to which the leftmost cell is connected is the color of the first transition source. In the example of FIG. 12, the R color is assigned to the leftmost cell of the sub code part 301 of the optical symbol by referring to the conversion table for the coding rule of FIG. 10A based on the K color of the cell of the main code part 300, which is the transition source cell, and the value "3d1" of the cell of the sub code part 301.

At step S14 following step S13 of FIG. 8, the color-code-including-work-instruction-sheet generator 38 generates the work instruction sheet 810 for the information processing system 12, which is rimmed with the peripheral part 812 having the border color, by using the color code image 811 generated at step S13.

Figure 13:
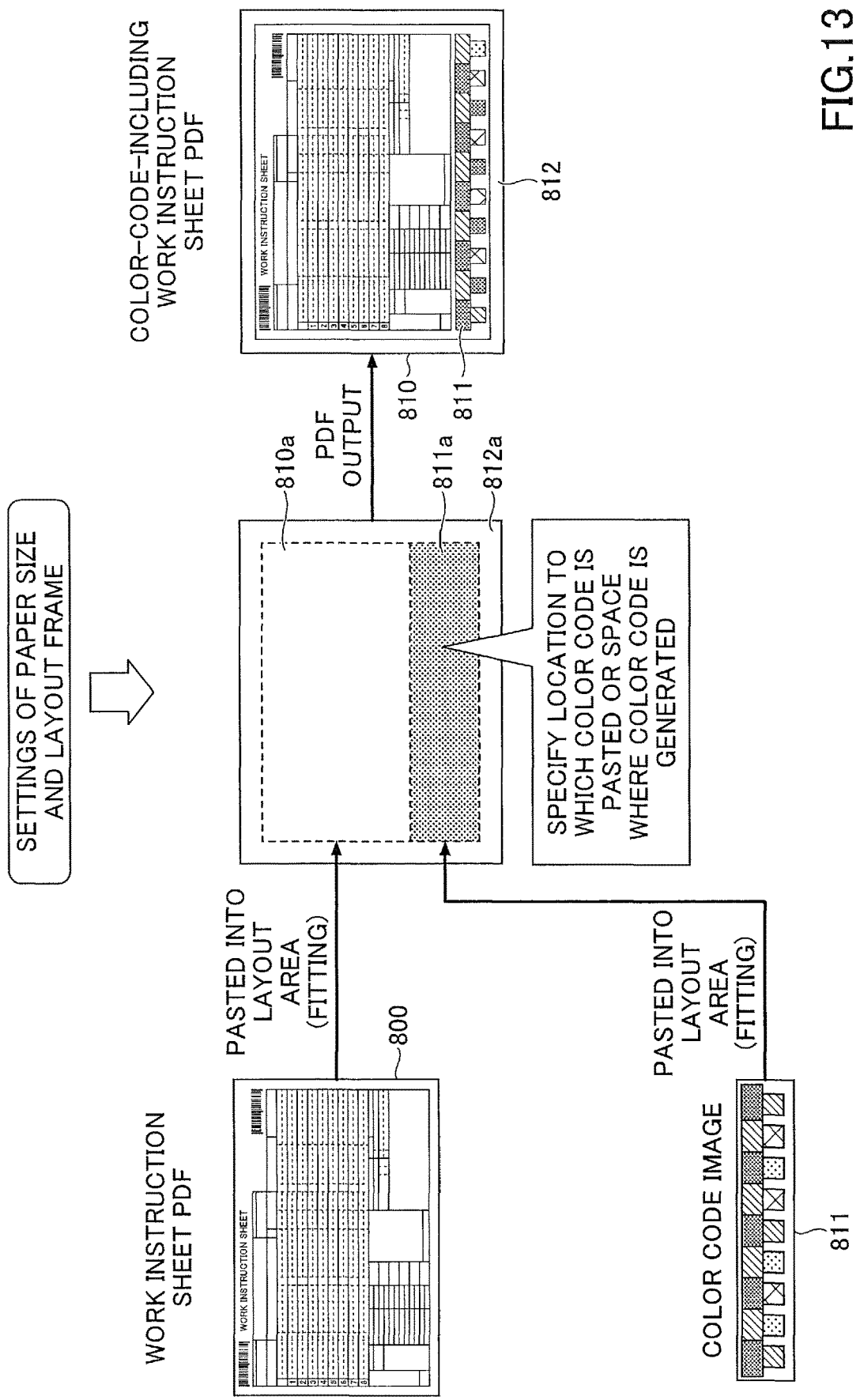
FIG. 13 is a drawing illustrating a process of generating a color-code-including work instruction sheet rimmed with a peripheral part having a border color.

FIG. 13 is a drawing illustrating a process of generating a color-code-including work instruction sheet rimmed with a peripheral part having a border color. The paper size and the layout frame may be set in advance by the operator. For example, the peripheral part 812 (an example of a predetermined area) may have a size and a shape preset by a user using the information processing system 12. Specifically, the user may set the peripheral part 812 as an area having a width of 5 cm from the edge of the work instruction sheet 810, as an area having a width of 10 cm from the edge of the work instruction sheet 810, or as an area outside of a rectangular or oval layout area.

The work instruction sheet 800 for the client system 10 illustrated in FIG. 2A is scaled down to generate an empty space. The work instruction sheet 810 for the information processing system 12 illustrated in FIG. 2B is generated by pasting the color code image 811 to the empty space generated by scaling down the work instruction sheet 800 for the client system 10 and providing the peripheral part 812 with the border color to rim the work instruction sheet 810.

The work instruction sheet 800 for the client system 10 illustrated in FIG. 2A includes the barcode image 801 used in the client system 10. Therefore, if the work instruction sheet 800 for the client system 10 is simply scaled down, the barcode image 801 may become non-functional (unrecognizable).

For this reason, the color-code-including-work-instruction-sheet generator 38 may scale down the work instruction sheet 800 in such a direction that the barcode image 801 does not become non-functional to generate the empty space without impairing the function of the barcode image 801.

At step S15 following step S14 of FIG. 8, the print instruction unit 40 instructs the printer 16 to print the work instruction sheet 810 (color-code-including work instruction sheet) for the information processing system 12 generated at step S14. In response to the instruction from the print instruction unit 40, the printer 16 prints the color-code-including work instruction sheet 810 (the work instruction sheet 810 for the information processing system 12) as exemplified in FIG. 2B, which is rimmed by the peripheral part 812 having the border color.

<<Updating Job Status>>

In the job management system 1 of the present embodiment, the work instruction sheet 810 for the information processing system 12 with the color code image 811 is captured by the cameras 18a1 through 18a5 and the cameras 18b1 and 18b2, and the job status in the job management table storage 48 is thereby updated.

Also, in the job management system 1 of the present embodiment, the work instruction sheet 810 for the information processing system 12 and the card 900 are captured by the cameras 18a1 through 18a5 and the cameras 18b1 and 18b2, and the flag table in the flag table storage 52 is updated as described below.

Figure 14:
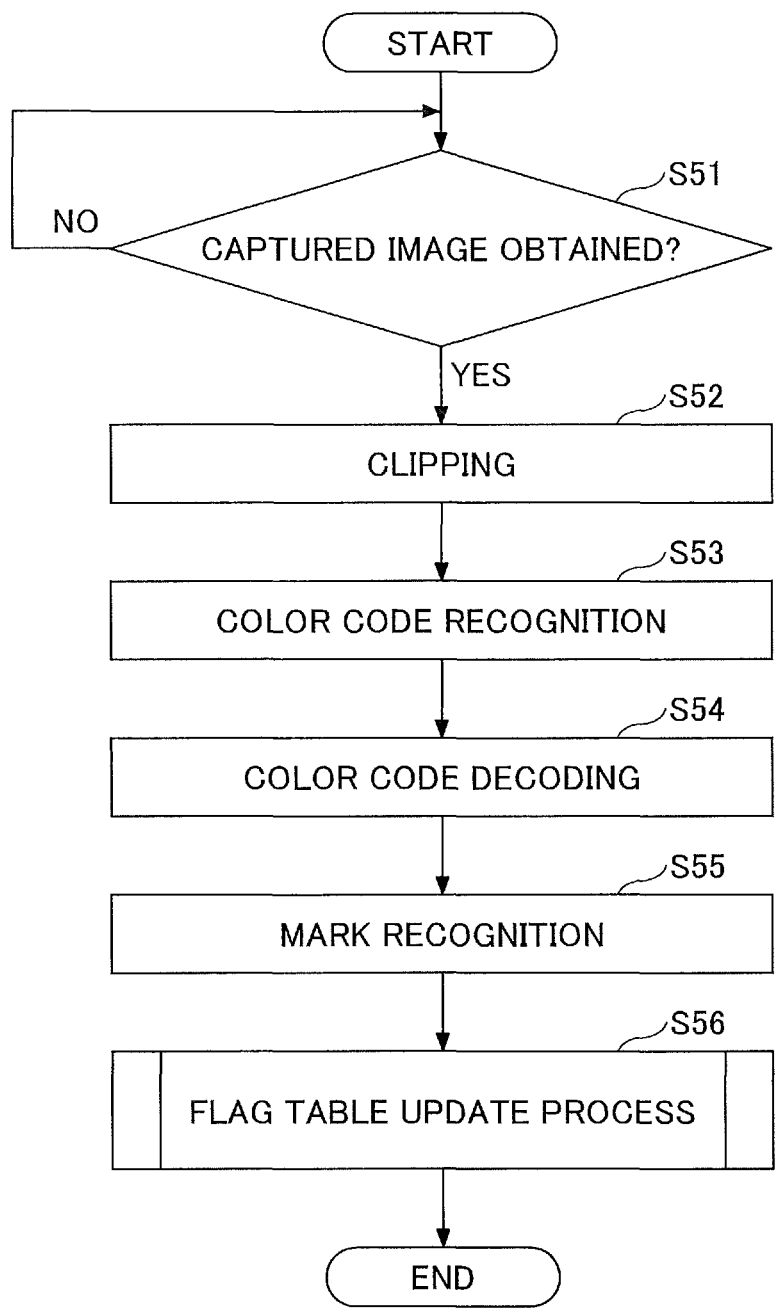
FIG. 14 is a flowchart illustrating an example of a job status update process.

FIG. 14 is a flowchart illustrating an example of a job status update process. When the captured image acquisition unit 42 of the work process management system 14 obtains a captured image or a captured video from one of the cameras 18a1 through 18a5 and the cameras 18b1 and 18b2, the process proceeds to step S52.

At step S52, the color code recognizer. 102 of the recognizer 44 attempts to clip the color code image 811 from the captured image or the captured video obtained by the captured image acquisition unit 42. At step S53, the color code recognizer 102 recognizes the color code image 811 according to a process described in, for example, Japanese Unexamined Patent Application Publication No. 2017-199306.

When the color code image 811 is recognized, the color code recognizer 102 detects an image of each cell from the color code image 811. At step S54, the color code recognizer 102 recognizes, as symbol information, color information and connection information of each cell detected at step S53. For example, the color code recognizer 102 restores the color code ID encoded in the color code image 811 by decoding the symbol information according to the coding rule illustrated in FIG. 10A.

At step S55, the mark recognizer 104 of the recognizer 44 recognizes the mark image 902 of the card 900 indicating the transferable state from the captured image or the captured video obtained by the captured image acquisition unit 42.

At step S56, the color code recognizer 102 provides, to the job manager 34, the identifier of one of the cameras 18a1 through 18a5 that has captured the color code image 811 and the color code ID restored by decoding. Also, the mark recognizer 104 provides, to the job manager 34, information indicating whether the mark image 902 has been recognized.

The job manager 34 refers to the job management table storage 48 to identify a job ID corresponding to the color code ID. For example, the job manager 34 can update the job status in the job information being managed in the job management table storage 48 from "not detected" to "passed" based on the identifier of one of the cameras 18a1 through 18a5 that has captured the color code image 811 and the job ID corresponding to the color code ID restored from the color code image 811.

Figure 15:
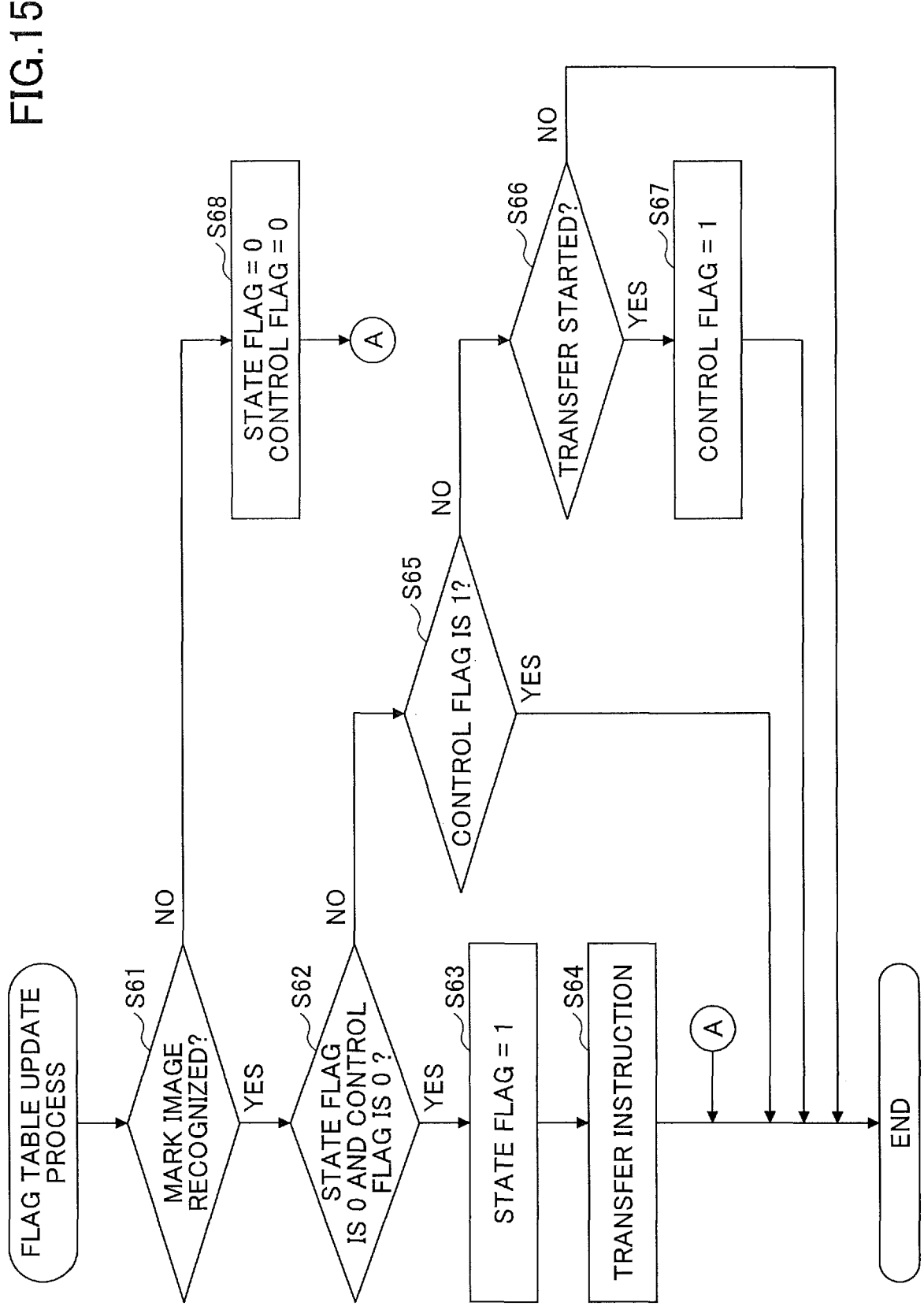
FIG. 15 is a flowchart illustrating an example of a flag table update process.

Also, the job manager 34 updates the flag table according to, for example, a process illustrated in FIG. 15 based on the identifier of one of the cameras 18b1 and 18b2 that has captured the color code image 811, the job ID corresponding to the color code ID restored from the color code image 811, and information indicating whether the mark image 902 has been recognized.

FIG. 15 is a flowchart illustrating an example of a flag table update process. When the information indicating whether the mark image 902 provided by the mark recognizer 104 has been recognized indicates at step S61 that the mark image 902 has been recognized, the job manager 34 proceeds to step S62.

At step S62, the job manager 34 determines whether the state flag in the flag table corresponding to the identified job ID is "0" indicating a state not transferable to the next work process and whether the control flag is "0" indicating that the state flag is valid.

When the state flag is "0" and the control flag is "0" in the flag table corresponding to the identified job ID, the job manager 34 proceeds to step S63 and changes the state flag to "1" indicating a state transferable to the next work process. The work object of the job whose flag table has been changed at step S63 such that the state flag is "1" and the control flag is "0", is managed as being in a state where the current work process has been completed and the work object is transferable to the next work process.

Then, at step S64, the job manager 34 sends information on the work object of the job whose current work process has been completed and that has become transferable to the next work process to the automated guided vehicle system 22 via the communication unit 50 to cause the automated guided vehicle 1100 to transfer the work object. Also, the job manager 34 sends the information on the work object of the job whose current work process has been completed and that has become transferable to the next work process to the user terminal 24 via the communication unit 50 to cause the user terminal 24 to display the information on the work object of the job transferable to the next work process and thereby cause the worker operating the user terminal 24 to transfer the work object. With this configuration, the job management system 1 of the present embodiment can transfer a work object of a job whose current work process has been completed and that is transferable to the next work process.

When one or both of the state flag and the control flag are not "0" in the flag table of the identified job ID at step S62, the job manager 34 proceeds to step S65 and determines whether the control flag is "1" indicating that the state flag is invalid.

If the control flag in the flag table of the identified job ID is "1", the job manager 34 ends the process of the flowchart of FIG. 15. With this configuration, the job management system 1 of the present embodiment can prevent mistakenly determining that a job work object is in a transferrable state based on the card 900 that is left placed on or attached to the job work object even after the job work object is transferred to the next work process.

At step S65, when the control flag in the flag table of the identified job ID is not "1", the job manager 34 proceeds to step S66 and determines whether the transfer of the work object of the job has been started.

When the transfer of the work object of the job has been started, the job manager 34 proceeds to step S67 and changes the control flag to "1" indicating that the state flag is invalid. With this configuration, the job management system 1 of the present embodiment can invalidate the state flag after the transfer to the next work process is started and until the state flag and the control flag are changed (initialized) to "0" at step S68 described later. The job manager 34 repeats the process of the flowchart of FIG. 15 until the transfer of the work object of the job is started.

When, at step S61, the information provided by the mark recognizer 104 indicating whether the mark image 902 has been recognized does not indicate that the mark image 902 has been recognized, the job manager 34 proceeds to step S68. At step S68, the job manager 34 changes (initializes) the state flag and the control flag to "0". With this configuration, for example, after a job work object is transferred to the next work process, the job management system 1 of the present embodiment can manage the job work object from which the card 900 is removed as being in the non-transferable state again until the next work process is completed.

A more specific example of the process of the flowchart of FIG. 15 is described below using job work objects 1000*a* and 1000*b*, the card 900, and flag tables illustrated in FIGS. 16 through 21.

Figure 16:
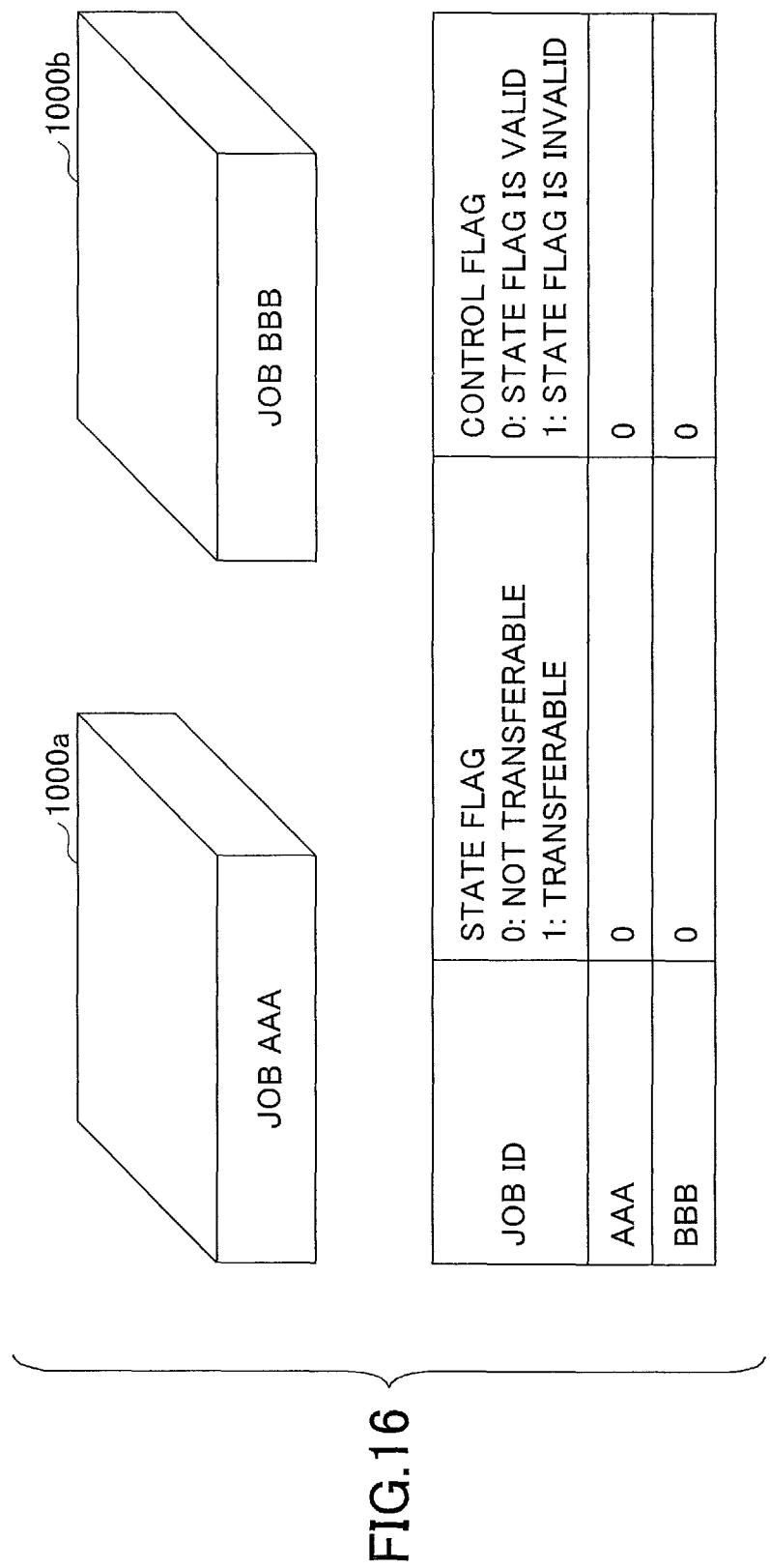
FIG. 16 is a drawing illustrating an example of an initial state.

FIG. 16 is a drawing illustrating an example of an initial state. FIG. 16 illustrates the work objects 1000*a* and 1000*b* before the current work process is completed. Because the current work process has not been completed, the card 900 is not placed on the work objects 1000*a* and 1000*b*. In the flowchart of FIG. 15, the mark image 902 has not been recognized and it is determined that the state flag and the control flag in the flag table are "0". Accordingly, in FIG. 16, the work objects are managed as being in the non-transferable state.

Figure 17:
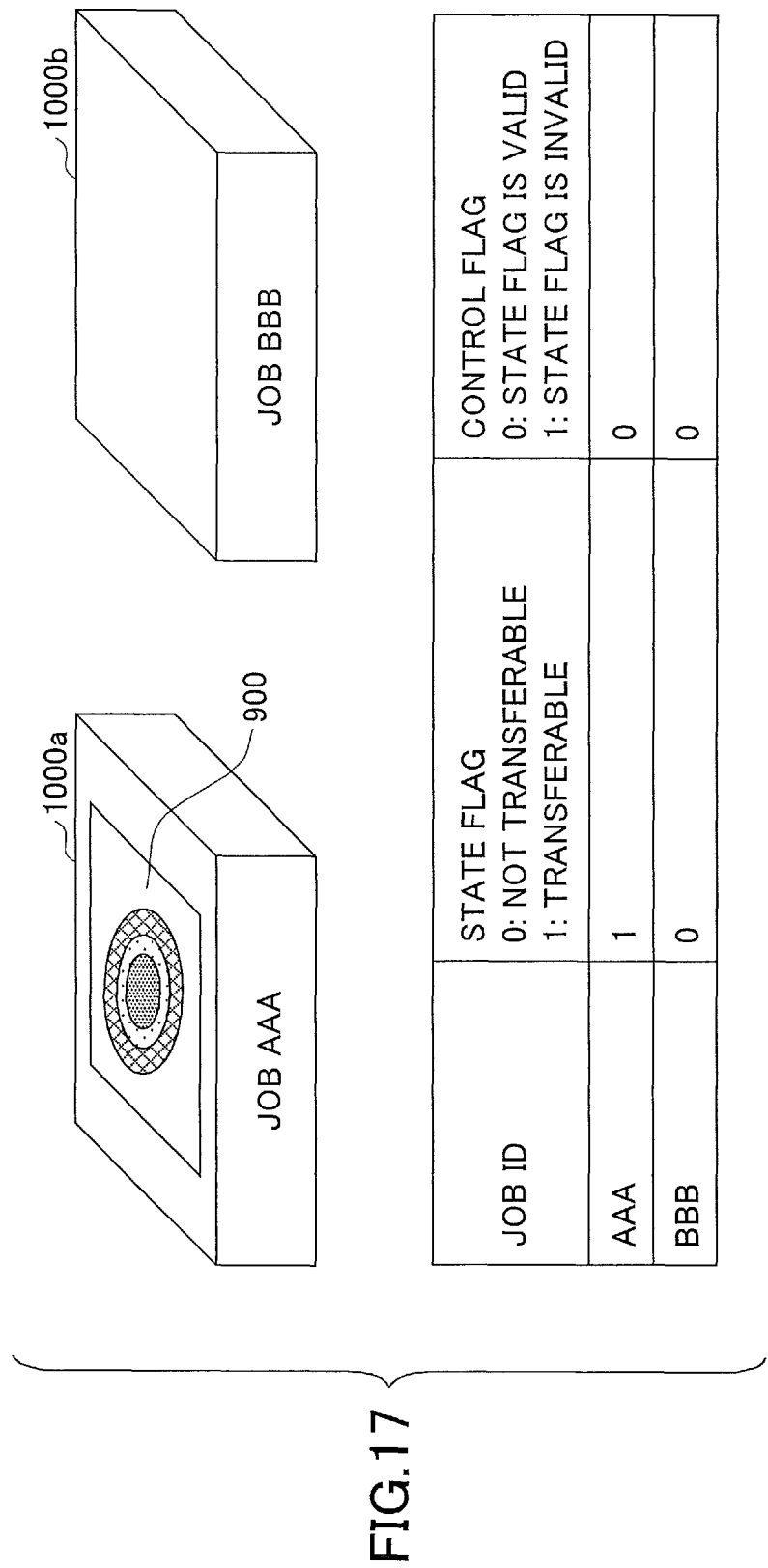
FIG. 17 is a drawing illustrating an example of a state where a card is placed on a work object.

FIG. 17 is a drawing illustrating an example of a state where a card is placed on a work object. In FIG. 17, the card 900 is placed on the work object 1000*a* of the job whose current work process has been completed. In the flowchart of FIG. 15, the mark image 902 is recognized, it is determined that the state flag is "0" and the control flag is "0" in the flag table of the identified job ID, the state flag is changed to "1" indicating the transferable state, and then the transfer of the work object 1000*a* is instructed. Thus, in FIG. 17, the work object 1000*a* of the job can be managed as being transferable to the next work process.

Figure 18:
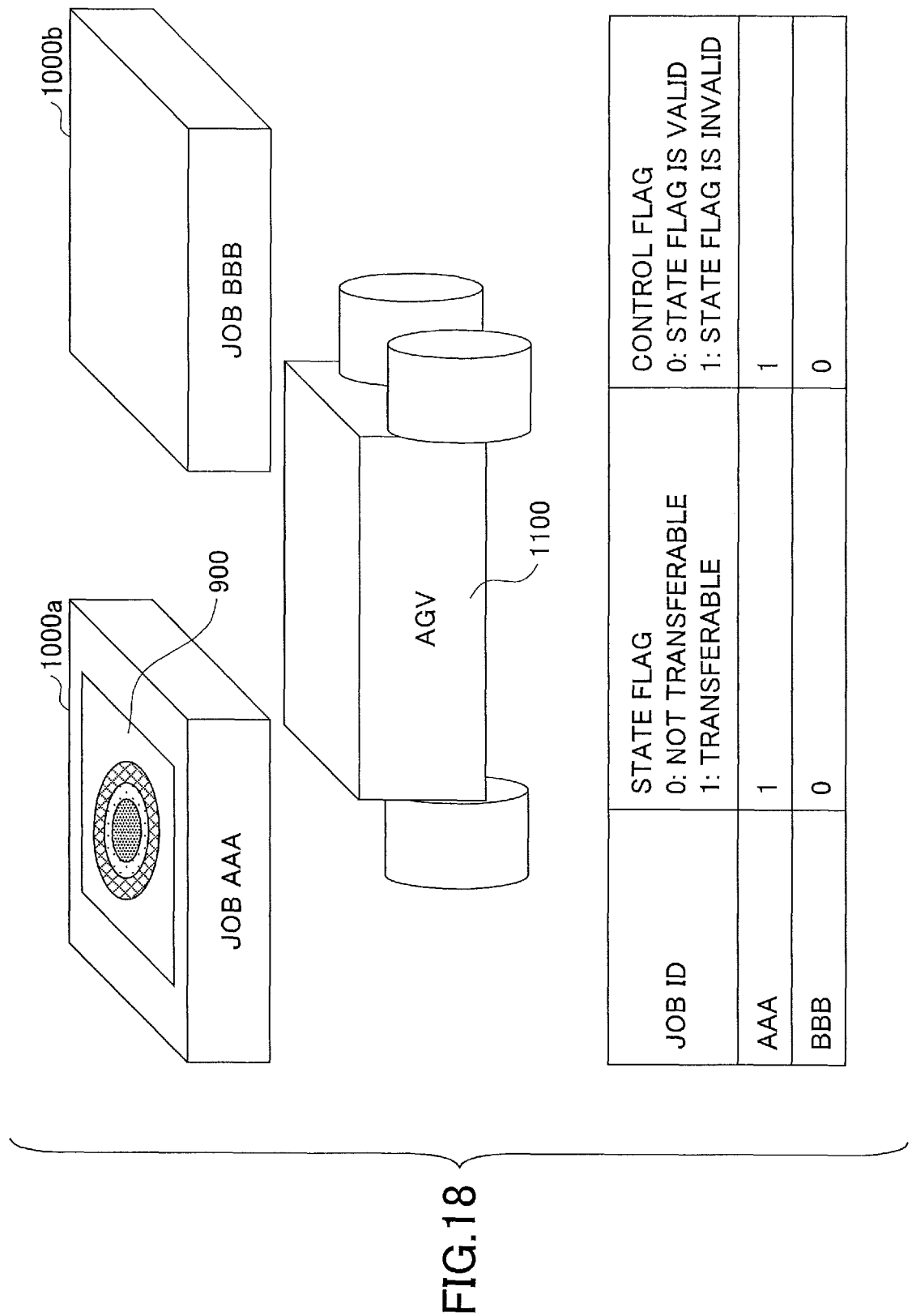
FIG. 18 is a drawing illustrating an example of a state where transfer is started by an automated guided vehicle.

FIG. 18 is a drawing illustrating an example of a state where transfer is started by an automated guided vehicle. In FIG. 18, the automated guided vehicle 1100 arrives and starts transferring the work object 1000*a* that is managed as being transferable to the next work process. In the flowchart of FIG. 15, because the transfer of the work object 1000*a* of job has been started, the control flag is changed from "0" to "1".

Figure 19:
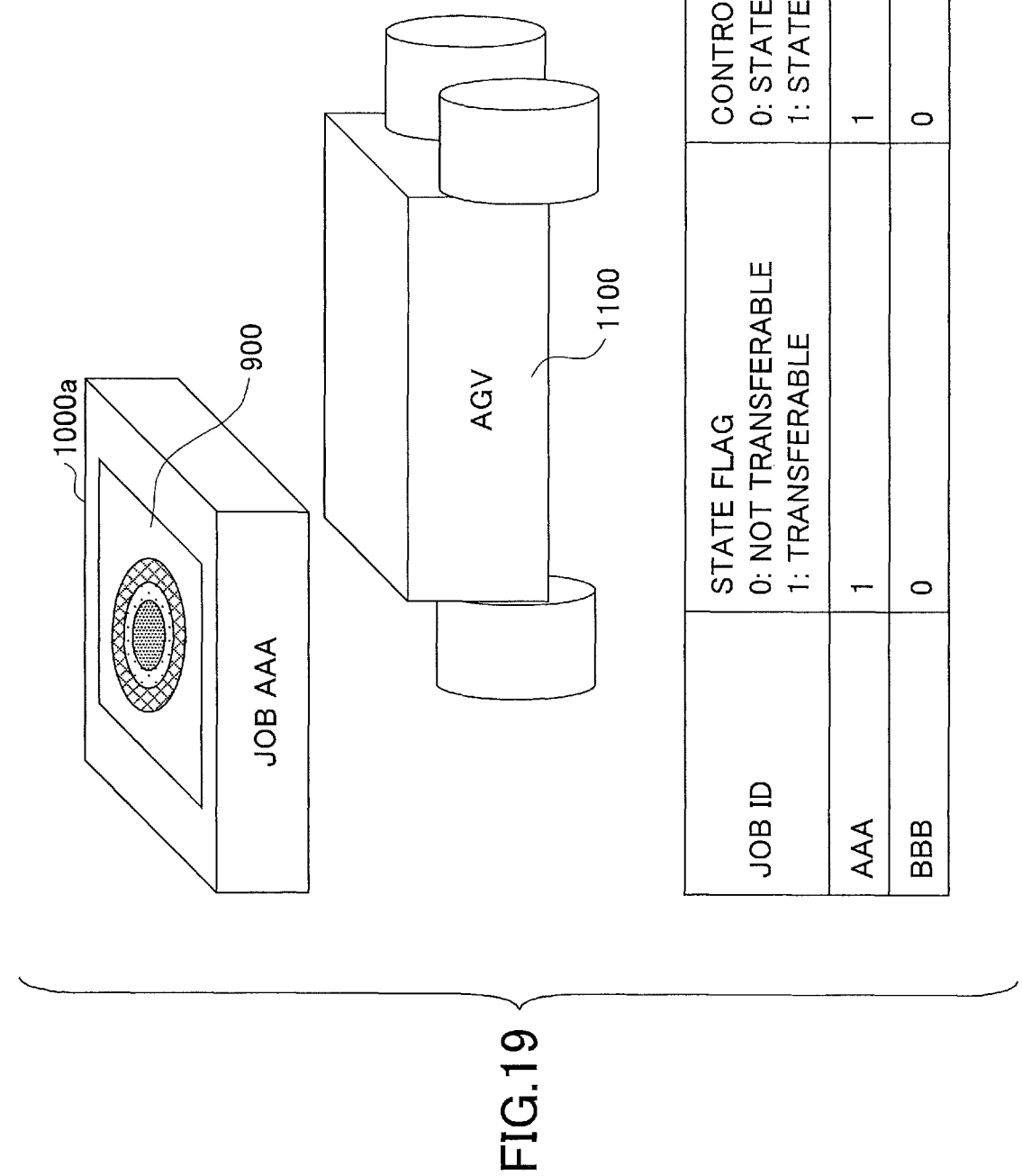
FIG. 19 is a drawing illustrating an example of a state where transfer by an automated guided vehicle has been completed.

FIG. 19 is a drawing illustrating an example of a state where transfer by an automated guided vehicle has been completed. FIG. 19 illustrates the work object 1000*a* that has been transferred to the next work process. In FIG. 19, the card 900 is still placed on the work object 1000*a*. In the flowchart of FIG. 15, the mark image 902 is recognized, and the state flag is invalidated because the control flag in the flag table of the identified job ID is "1". In FIG. 19, the work object 1000*a* is prevented from being mistakenly recognized as being in the transferable state because of the card 900 left on the work object 1000*a*.

Figure 20:
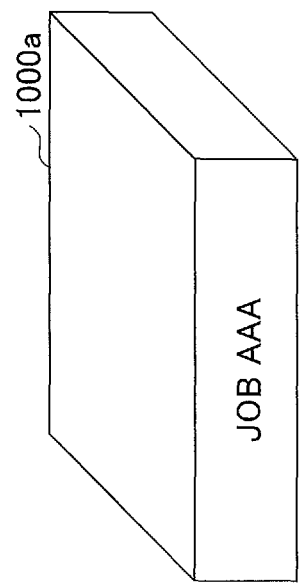
FIG. 20 is a drawing illustrating an example of a state where a card has been removed.

FIG. 20 is a drawing illustrating an example of a state where a card has been removed. FIG. 20 illustrates a state in which the card 900 has been removed from the work object 1000*a* that has been transferred to the next work process. In the flowchart of FIG. 15, the mark image 902 is not recognized, and the state flag and the control flag are changed (initialized) to "0". Thus, in FIG. 20, after the work object 1000*a* is transferred to the next work process, the work object 1000*a* from which the card 900 is removed can be managed again as being in the non-transferable state until the next work process (the current work process) is completed.

Figure 21:
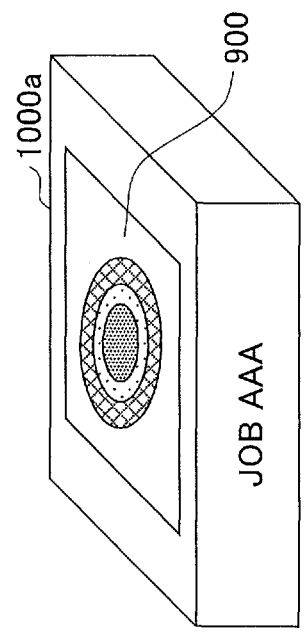
FIG. 21 is a drawing illustrating an example of a state where a card is placed on a work object again.

FIG. 21 is a drawing illustrating an example of a state where a card is placed on a work object again. In FIG. 21, because the next work process (the current work process) has been completed, the card 900 is placed on the work object 1000*a*. In FIG. 21, similarly to FIG. 17, the work object 1000*a* transferred to the next work process can be managed as being transferable to the work process after the next work process.

As described above, the work process management system 14 of the present embodiment makes it possible to manage a work object whose current work process has been completed and that is transferable to the next work process by simply placing the card 900 on the work object transferable to the next work process while preventing the work object transferred to the next work process from being mistakenly recognized as still being transferable.

For example, when the work process management system 14 of the present embodiment cooperates with the automated guided vehicle system 22 to cause the automated guided vehicle 1100 to transfer the work object 1000*a*, the work process management system 14 can easily identify the work object 1000*a* whose current work process has been completed and that is transferable to the next work process and can also prevent transfer of a non-transferable work object due to misidentification.

The job management system 1 of the present embodiment is particularly useful for the combination of free location and automatic transportation. Free location is a management method in which locations for storing work objects are not fixed. Also, locations indicate places where work objects are stored.

The present embodiment enables the worker to input a transferable state through a single action of placing the card 900 on a work object and makes it possible to automatically input a non-transferable state after transfer to the next work process. Also, in an environment where an input environment cannot be provided, the present embodiment makes it possible to prevent a delay in inputting the completion of work by the worker and prevent misidentification of a work object to be transferred. The card 900, which is a paper sheet on which the mark image 902 is printed, can be reused.

Second Embodiment

In the first embodiment, the card 900, which is a paper sheet, is described as an example of a medium on which the mark image 902 is printed. However, the card 900 or the mark image 902 may be displayed on a device such as electronic paper or a liquid crystal display (LCD).

Figure 22:
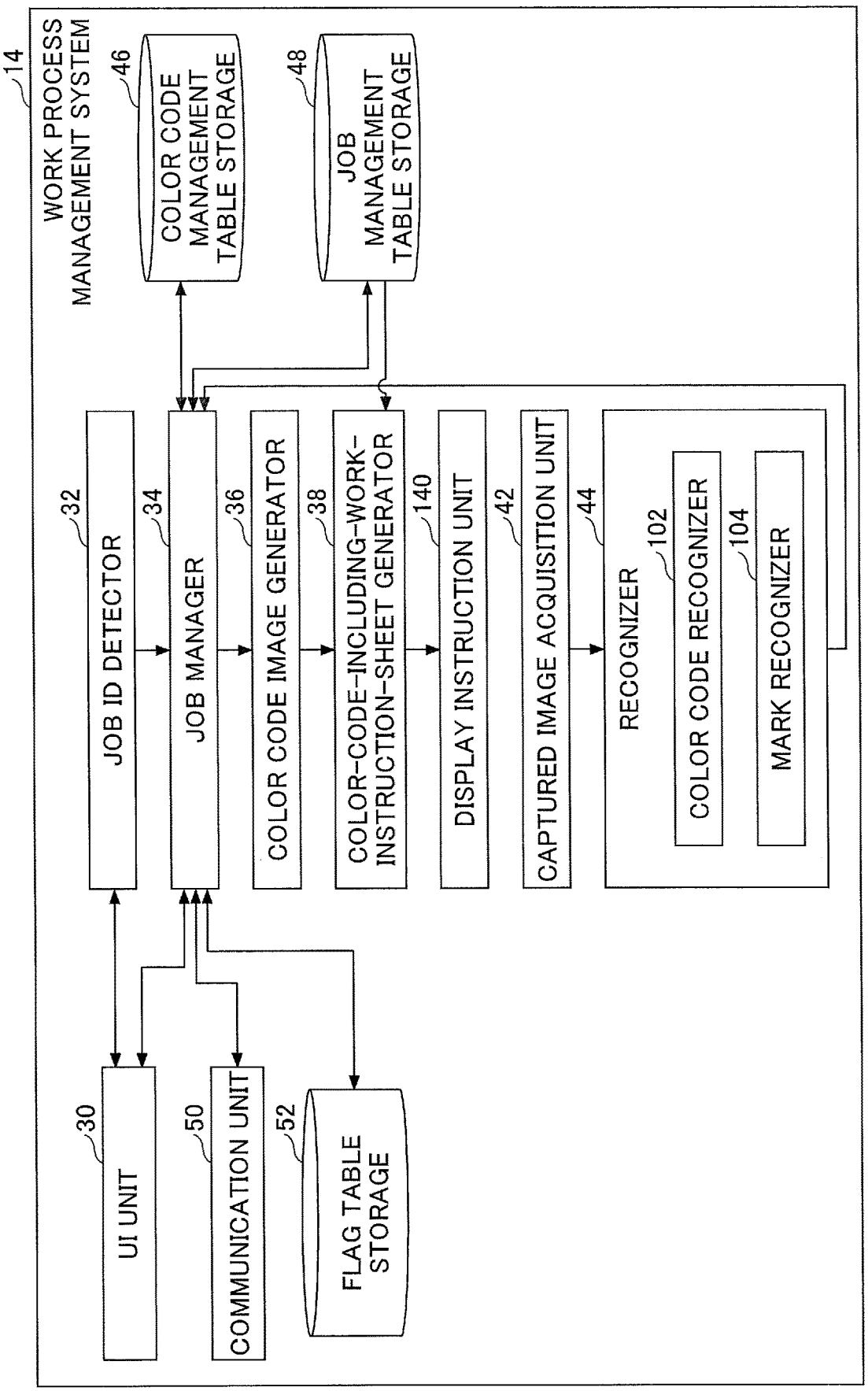
FIG. 22 is a drawing illustrating another example of a functional configuration of a work process management system.

FIG. 22 is a drawing illustrating another example of a functional configuration of a work process management system. The work process management system 14 of FIG. 22 has a configuration in which the print instruction unit 40 of the work process management system 14 of FIG. 4 is replaced with a display instruction unit 140. The display instruction unit 140 instructs a device to display the card 900 of FIG. 5. For example, the device displays an image of the card 900 of FIG. 5.

Third Embodiment

In the first and second embodiments, the management of transfer of work objects in a printing factory is described. However, the present invention may also be applied to the control of branching of a belt conveyor for conveying articles.

An information processing system, an information processing method, a storage medium, and an information processing apparatus according to the embodiments of the present invention are described above. However, the present invention is not limited to the specifically disclosed embodiments, and variations and modifications may be made without departing from the scope of the present invention. The cameras 18*a*1 through 18*a*5 and the cameras 18*b*1 and 18*b*2 are examples of imagers. The job manager 34 is an example of a management unit. The mark recognizer 104 is an example of a recognition unit.

An aspect of this disclosure makes it possible to easily manage a job work object that is transferable to the next work process.

What is claimed is:

1. An information processing system for managing progress of a job including one or more work processes, the information processing system comprising:
one or more imagers that are associated with the one or more work processes of the job and configured to capture a form being transferred together with a work object of the job; and
a processor programmed to execute a process including
managing the one or more work processes of the job based on the one or more imagers capturing the form,
recognizing a mark image indicating that the work object is transferable to a next work process by a mobile transport vehicle from image data of the form captured by the one or more imagers, and
managing whether the work object is transferable to a next work process based on the mark image recognized from the image data obtained by capturing the form.

2. The information processing system as claimed in claim 1, wherein the processor is programmed to
manage, for the work object, a state flag indicating whether the work object is transferable to the next work process and a control flag indicating whether the state flag is valid or invalid, and
change the control flag, from a valid value indicating that the state flag is valid to an invalid value indicating that the state flag is invalid when the work object is transferred from a previous work process to the next work process.

3. The information processing system as claimed in claim 2, wherein the processor is programmed to change the state flag from a non-transferable state where the work object is not transferable to the next work process to a transferable state where the work object is transferable to the next work process when the mark image is recognized from the image data and the control flag is set at the valid value.

4. The information processing system as claimed in claim 3, wherein the processor is programmed to change the state flag from the transferable state to the non-transferable state and change the control flag from the invalid value to the valid value when the control flag is set at the invalid value and the mark image is not recognizable from the image data.

5. The information processing system as claimed in claim 1, wherein
the mobile transport vehicle is an automated guided vehicle; and
the processor is programmed to send information on the work object transferable to the next work process to an automated guided vehicle system to cause the automated guided vehicle to transfer the work object.

6. The information processing system as claimed in, claim 1, wherein the processor is programmed to cause a user terminal operated by a user to display information on the work object transferable to the next work process.

7. The information processing system as claimed in claim 1, wherein the nark image indicating transferability is printed or displayed on a medium attached to the work object or to the mobile transport vehicle transporting the work object.

8. The information processing system as claimed in claim 1, wherein the processor is programmed to
determine that the work object is not transferable to a next work process when the work object is transferred from a previous work process to the next work process, and the mark image is recognized from the image data.

9. A method performed by an information processing apparatus for managing progress of a job including one or more work processes, the method comprising:

managing the one or more work processes of the job based on one or more imagers that are associated with the one or more work processes of the job and configured to capture a form being transferred together with a work object of the job;

recognizing a mark image indicating that the work object is transferable to a next work process by a mobile transport vehicle from image data of the form captured by the one or more imagers; and managing whether the work object is transferable to a next work process based on the mark image recognized from the image data obtained by capturing the form.

10. A non-transitory computer-readable storage medium storing a program for causing a computer to execute the method of claim 9.

11. An information processing apparatus for managing progress of a job including one or more work processes, the information processing apparatus comprising:

a processor programmed to execute a process including managing the one or more work processes of the job based on one or more imagers that are associated with the one or more work processes of the job and configured to capture a form being transferred together with a work object of the job, recognizing a mark image indicating that the work object is transferable to a next work process by a mobile transport vehicle from image data of the form captured by the one or more imagers, and managing whether the work object is transferable to a next work process based on the mark image recognized from the image data obtained by capturing the form.

* * * * *